(12) United States Patent
Noach et al.

(10) Patent No.: US 11,791,602 B2
(45) Date of Patent: Oct. 17, 2023

(54) Q-SWITCHED LASER SYSTEM

(71) Applicant: JERUSALEM COLLEGE OF TECHNOLOGY, Jerusalem (IL)

(72) Inventors: Salman Noach, Jerusalem (IL); Uzziel Sheintop, Haggay (IL); Eytan Moshe Perez, Jerusalem (IL)

(73) Assignee: JERUSALEM COLLEGE TECHNOLOGY, Jerusalem (IL)

( * ) Notice: Subject to any disclaimer, the term of this patent is extended or adjusted under 35 U.S.C. 154(b) by 238 days.

(21) Appl. No.: 17/057,072

(22) PCT Filed: May 22, 2019

(86) PCT No.: PCT/IL2019/050581
§ 371 (c)(1),
(2) Date: Nov. 19, 2020

(87) PCT Pub. No.: WO2019/224822
PCT Pub. Date: Nov. 28, 2019

(65) Prior Publication Data
US 2021/0167570 A1    Jun. 3, 2021

Related U.S. Application Data

(60) Provisional application No. 62/850,743, filed on May 21, 2019.

(30) Foreign Application Priority Data

May 22, 2018 (IL) ............................................ 259535

(51) Int. Cl.
*H01S 3/117* (2006.01)
*H01S 3/1115* (2023.01)
(Continued)

(52) U.S. Cl.
CPC ........ *H01S 3/1115* (2013.01); *H01S 3/08059* (2013.01); *H01S 3/09415* (2013.01);
(Continued)

(58) Field of Classification Search
CPC ............... H01S 3/1115; H01S 3/08059; H01S 3/094053; H01S 3/09415; H01S 3/1062;
(Continued)

(56) References Cited

U.S. PATENT DOCUMENTS 3,582,815 A   6/1971  Siebert
4,965,803 A * 10/1990  Esterowitz ................ H01S 3/16
                                                    372/98

(Continued)

OTHER PUBLICATIONS

X. Wang et. al.; "Dual-wavelength Q-switched Er: YAG laser around 1.6 um for methane differential absorption lidar"; Laser Physics Letters, vol. 10, No. 11, Oct. 16, 2013 (Year: 2013).*

(Continued)

*Primary Examiner* — Xinning (Tom) Niu
(74) *Attorney, Agent, or Firm* — The Roy Gross Law Firm, LLC; Roy Gross

(57) ABSTRACT

A laser system, comprising: a laser cavity, a gain medium positioned within the laser cavity, a pump source optically coupled to the gain medium, an input minor positioned at a first end of the laser cavity, an output coupler positioned at a second end of the laser cavity, a first etalon positioned within the laser cavity, and a q-switching element positioned within the laser cavity, wherein the laser system is configured to provide a laser beam at a selected wavelength ranging of 1700 to 3000 nm with a tunable spectral range of at least 10 nm. A method for using the laser system e.g., for producing a pulsed laser beam is further disclosed.

19 Claims, 18 Drawing Sheets

(51) Int. Cl.
*H01S 3/08* (2023.01)
*H01S 3/094* (2006.01)
*H01S 3/0941* (2006.01)
*H01S 3/106* (2006.01)
*H01S 3/16* (2006.01)

(52) U.S. Cl.
CPC ...... *H01S 3/094053* (2013.01); *H01S 3/1062* (2013.01); *H01S 3/117* (2013.01); *H01S 3/1616* (2013.01); *H01S 3/1638* (2013.01); *H01S 3/1653* (2013.01)

(58) Field of Classification Search
CPC ...... H01S 3/117; H01S 3/1616; H01S 3/1638; H01S 3/1653; H01S 3/0623; H01S 3/08027; H01S 3/08036; H01S 3/113; H01S 3/1643; H01S 2302/00
See application file for complete search history.

(56) References Cited

U.S. PATENT DOCUMENTS

| | | | |
|---|---|---|---|
| 5,457,706 A | 10/1995 | McGuckin et al. | |
| 9,905,990 B1 | 2/2018 | Pohl et al. | |
| 2007/0098024 A1* | 5/2007 | Mitchell | H01S 3/09415 372/10 |
| 2007/0116068 A1* | 5/2007 | Mao | H01S 3/113 372/10 |

OTHER PUBLICATIONS

M E Doroshenko et al "Tunable mid-infrared laser properties of Cr2+:ZnMgSe and Fe2+:ZnSe crystals", Laser Phys. Lett. 7 38, pp. 38-45, 2010. (Year: 2010).*
Lippert E, Nicolas S, Arisholm G, Stenersen K, Rustad G. Midinfrared laser source with high power and beam quality. Appl Opt. Jun. 1, 2006;45(16):3839-45. doi: 10.1364/ao.45.003839. PMID: 16724147.
Wang, X., Fritsche, H., Lux, O., Eichler, H. J., Zhao, Z. G., Schuett, C., & Kruschke, B. (2013) Dual-wavelength Q-switched Er: YAG laser around 1.6 μm for methane differential absorption lidar. Laser Physics Letters, 10(11), 115804.
Lei, Y., Mao, A., Li, Y., Zhang, Y., Liu, H., & Zhang, Y. (2018) Research on single longitudinal mode laser based on FP etalon and Q-switched delay. Optik, 167, 1-6.
Sebbag D, Korenfeld A, Ben-Ami U, Elooz D, Shalom E, Noach S. Diode end-pumped passively Q-switched Tm:YAP laser with 1.85-mJ pulse energy. Opt Lett. Apr. 1, 2015;40(7):1250-3. doi: 10.1364/OL.40.001250. PMID: 25831305.
Uzziel Sheintop, Eytan Perez, and Salman Noach, "Watt-level tunable narrow bandwidth Tm:YAP laser using a pair of etalons," Appl. Opt. 57, 1468-1471 (2018).
Wang M, Zhu L, Chen W, Fan D. High-energy directly diode-pumped Q-switched 1617 nm Er:YAG laser at room temperature. Opt Lett. Sep. 1, 2012;37(17):3732-4. doi: 10.1364/OL.37.003732. PMID: 22941006.
Wang L, Gao C, Gao M, Liu L, Yue F. Diode-pumped 2 μm tunable single-frequency Tm:LuAG laser with intracavity etalons. Appl Opt. Feb. 20, 2013;52(6):1272-5. doi: 10.1364/AO.52.001272. PMID: 23434999.
Xu L, Zhang S, Chen W. Tm:YLF laser-pumped periodically poled MgO-doped congruent LiNbO3 crystal optical parametric oscillators. Opt Lett. Feb. 15, 2012;37(4):743-5. doi: 10.1364/OL.37. 000743. PMID: 22344167.
Eytan P., Rotem N., Uzziel S., and Salman N. "Active and passive Q-switched tunable mJ level Tm laser", Proc. SPIE 11033, High-Power, High-Energy, and High-Intensity Laser Technology IV, 110330D (Apr. 26, 2019); https://doi.org/10.1117/12.2507200.
Uzziel Sheintop, Eytan Perez, Daniel Sebbag, Pavel Komm, Gilad Marcus, and Salman Noach, "Actively Q-switched tunable narrow bandwidth milli-Joule level Tm:YLF laser," Opt. Express 26, 22135-22143 (2018).
Sheintop, U., Perez, E. and Noach, S. Narrow Bandwidth Tunable Watt Level Tm:YAP Laser using Two Etalons. In Proceedings of the 6th International Conference on Photonics, Optics and Laser Technology (PHOTOPTICS 2018), pp. 303-307 DOI: 10.5220/0006721403030307.
U. Sheintop, E. Perez, R. Nahear, S. Noach Widely tunable, narrow bandwidth, mJ level Tm:YAP laser with YAG Etalons, Optics & Laser Technology, vol. 136, 2020, 106710 https://doi.org/10.1016/j.optlastec.2020.106710.
Godard, A. (2007). Infrared (2-12 μm) solid-state laser sources: a review. Comptes Rendus Physique, 8(10), 1100-1128.
Godard, Antoine & Raybaut, Myriam & Lefebvre, Michel & Michel, Anne-Marie & Pealat, Michel. (2012). Tunable mid-infrared optical parametric oscillator with intracavity parametric amplification based on a dual-grating PPLN crystal. Applied Physics B. 109. 567. 10.1007/s00340-012-5153-z.
Berrou, A & Godard, Antoine & Rosencher, E & Lefebvre, Michel & Spiekermann, S. (2007). Mid-IR Entangled-Cavity Doubly Resonant OPO pumped by a micro-laser. Conference on Lasers and Electro-Optics, 2007, CLEO 2007. 10.1109/CLEO.2007.4452814.
International Search Report of PCT/IL2019/050581 dated Sep. 19, 2019; Mailed Sep. 19, 2019 3 pages.
Written Opinion of PCT/IL2019/050581 dated Sep. 19, 2019; Mailed Sep. 19, 2019 4 pages.

* cited by examiner

Q-SWITCHED LASER SYSTEM

CROSS REFERENCE TO RELATED APPLICATIONS

This application is a National Phase Application of, and claims the benefit of priority to, PCT International Application No. PCT/IL2019/050581, International Filing Date May 22, 2019, claiming the benefit of priority of U.S. Provisional Patent Application No. 62/850,743, filed May 21, 2019, and Israel Patent Application No. IL 259535, filed May 22, 2018, each of which are hereby incorporated by reference.

FIELD OF THE INVENTION

The invention relates to the field of laser Q-switching.

BACKGROUND

Diode-pumped solid-state lasers are generally considered the most practical source of laser radiation for applications requiring high efficiency and compact, low-weight, and rugged packaging. Laser diode pump sources have high electrical-to-optical conversion efficiency, and the narrow-band spectral output of laser diodes can be chosen to closely match the absorption bands of solid-state laser materials.

Q-switching provides short duration optical pulses required for laser ranging, non-linear studies, medicine, and other important applications.

Lasers operating in the eye-safe 2 μm region have various applications in the fields of medical microsurgery, infrared neural stimulation, plastic material processing, gas spectroscopy, remote sensing, and is well established as a pump source for lasers in the mid-infrared (IR) region.

Some of those applications require the laser source to have one or more properties such as: tunability, narrow spectral bandwidth, nearly diffraction limited beam and pulsed radiation. Especially, there is a desired need in lasers combining spectral tunability and pulsed operation, allowing more precise control of the laser parameters.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a laser system, comprising a laser cavity, a gain medium positioned within the laser cavity, a pump source optically coupled to the gain medium; an input mirror positioned at a first end of the laser cavity, an output coupler positioned at a second end of the laser cavity, a first etalon positioned within the laser cavity, and a q-switching element positioned within the laser cavity; wherein the laser system is configured to provide a pulsed laser beam at a selected wavelength ranging of 1700 to 3000 nm with a tunable spectral range of at least 10 nm; wherein the gain medium, the pump source, the input mirror, the output coupler, the first etalon, and the q-switching element are at a light-pass of the pulsed laser beam; and wherein the q-switching element provides a pulse switching of a laser beam.

In some embodiments, the laser system further comprises a second etalon positioned next to the first etalon at a light-pass of the pulsed laser beam.

In some embodiments, the second etalon is characterized by a thickness of 100 to 600 μm.

In some embodiments, the first etalon is characterized by a thickness of 10 to 100 μm.

In some embodiments, the gain medium comprises at least one host crystal selected from the group consisting of: YAG, Yttrium Aluminum Perovskite $YAlO_3$ (YAP), Lithium Lutetium Fluoride (LiLuF), and Yttrium Lithium Fluoride (YLF).

In some embodiments, the host crystal is doped with a rare earth element selected from the group consisting of: Thulium (Tm), Holmium (Ho), Chromium (Cr), Erbium (Er), or any combination thereof.

In some embodiments, the gain medium comprises a YAP and/or YLF host crystal doped with Tm.

In some embodiments, the laser beam is characterized by a wavelength in the range from 1800 to 2100 nm.

In some embodiments, the laser beam has a spectral bandwidth of less than 1 nm.

In some embodiments, the q-switching element is selected from an active q-switching element and a passive q-switching element.

In some embodiments, the passive q-switching element comprises a saturable absorber configured to provide passive pulse switching of said laser beam.

In some embodiments, the saturable absorber comprises Cr:ZnS or Cr:ZnSe.

In some embodiments, the active q-switching element comprises an Acousto-Optic-Modulator (AOM) configured to provide active pulse switching of said laser beam.

In some embodiments, the laser system comprises one or more lenses, allowing to optically couple the pump source to the gain medium.

There is provided, in accordance with an embodiment, a method for producing a pulsed laser beam, the method comprises: (i) providing a laser system comprising a laser cavity, a gain medium positioned within the laser cavity, a pump source optically coupled to the gain medium, an input mirror positioned at a first end of the laser cavity, an output coupler positioned at a second end of the laser cavity, a first etalon positioned within the laser cavity, and a q-switching element positioned within the laser cavity, and wherein the gain medium, the pump source, the input mirror, the output coupler, the first etalon, and the q-switching element are at a light-pass of the pulsed laser beam; (ii) supplying electrical power to the pump source so as to energize the gain medium, thereby generating the pulsed laser beam at a selected wavelength ranging from 1700 to 3000 nm with a tunable spectral range of at least 10 nm.

In some embodiments, the laser system further comprises a second etalon positioned next to the first etalon at a light-pass of the pulsed laser beam.

In some embodiments, the pulsed laser beam is characterized by a pulse energy of at least 0.8 mJ.

In some embodiments, the pulsed laser beam is characterized by a wavelength in the range from 1800 to 2100 nm.

In some embodiments, the pulsed laser beam is characterized by a tunable spectral range of at least 10 nm.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods, systems, and/or materials are described below. In case of conflict, the patent specification, including definitions, will control. In addition, the materials, methods, and examples are illustrative only and are not intended to be necessarily limiting.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIG. 8A presents a graph showing pulse energy as a function of the absorbed pump power. FIG. 8B presents a graph showing pulse duration as a function of the absorbed pump power. FIG. 8C presents a graph showing peak power as a function of the absorbed pump power.

FIG. 10A presents a graph showing laser average power (λ=1934 nm, repetition rate=280-1660 Hz, pulse duration: 24, 29 ns for 70% and 85% OC respectively). FIG. 10B presents a graph showing laser peak energy (λ=1935 nm, repetition rate=280-1660 Hz, pulse duration: 24 ns for 70% OC).

DETAILED DESCRIPTION

Disclosed herein is a tunable Q-switched laser, according to certain exemplary embodiments.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

Disclosed herein is a laser system, e.g., a laser generating light with a wavelength in the micrometer range. In some embodiments, the laser is a pulsed laser, which may be used for a variety of applications, e.g., surgery, military applications, material processing, optical communication, Light Detection and Ranging (LIDAR) or the like.

Optionally, the system is able of generating a high-energy pulse with a pulse energy in the mJ range.

In some embodiments, the system may further include at least one etalon (also referred to as: "etalon plate"). Optionally, the etalon allows to adjust the spectral bandwidth of the laser light. Optionally, the etalon allows to adjust the tunability (e.g., the free spectral range) of the wavelength of the emitted light.

Optionally, the etalon may be an optical device having a desired reflectivity. Optionally, the etalon may comprise Yttrium Aluminum Garnet (YAG). Optionally, the etalon is improved by depositing a dielectric multi-layer thin film on one surface or both surfaces. Optionally, the spectral bandwidth of the laser light may be adjusted by reflectivity, a thickness, or a refractive index of the etalon, for example, by limiting a transmission wavelength band thereof when the laser light is transmitted through the etalon.

Optionally, etalons having various thicknesses may be used to adjust the spectral bandwidth and to provide tunability of the spectral range. Optionally, the spectral bandwidth and/or spectral range tunability of the laser light may be modified by adjusting the thickness of the etalons.

Optionally, by "at least one etalon" it is meant to refer to at least two etalon plates. Optionally, the system includes a pair of etalon plates.

Figure 1:
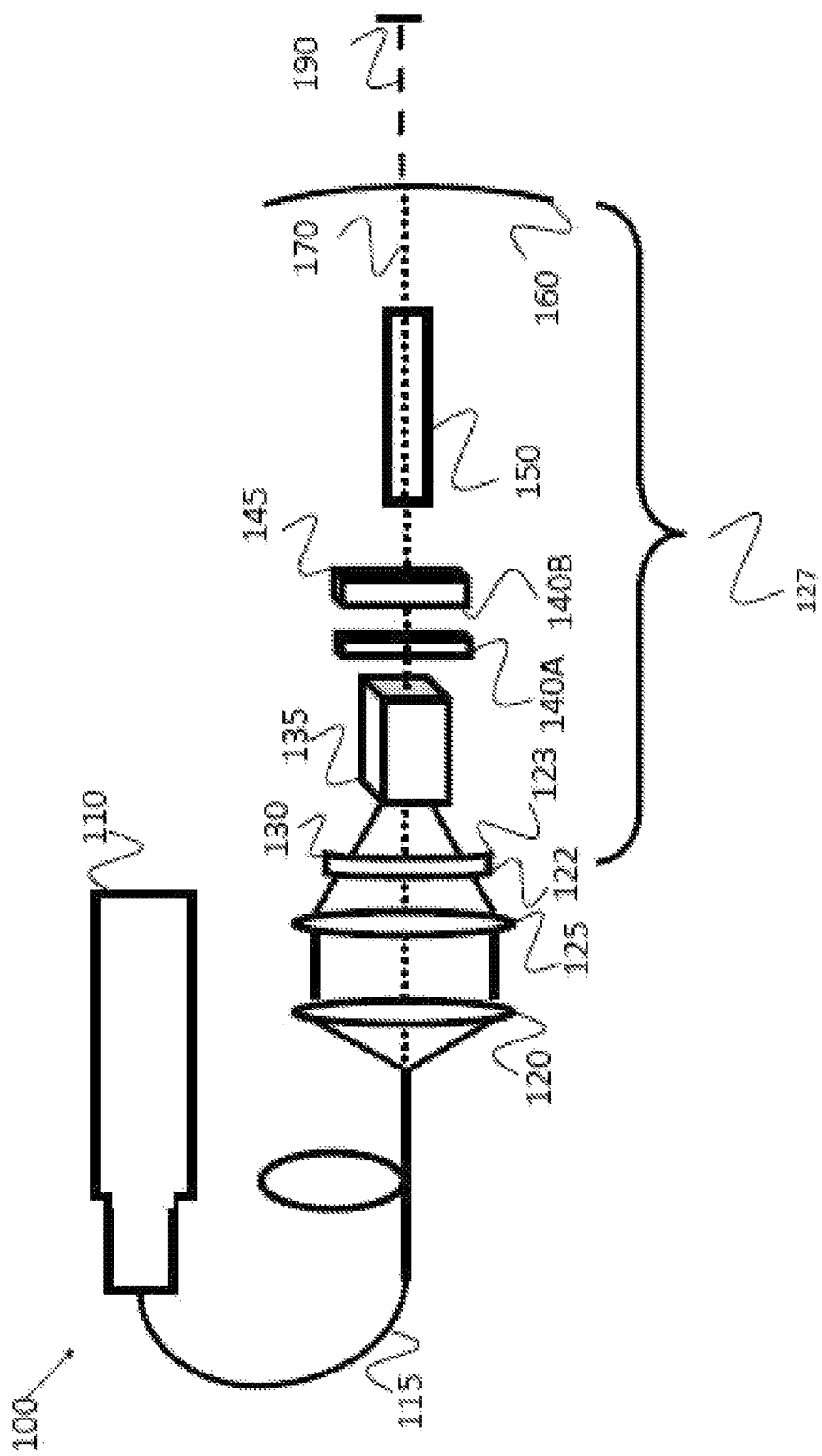
FIG. 1 is a schematic illustration of an exemplary laser system, according to certain exemplary embodiments of the subject matter.
Figure 2:
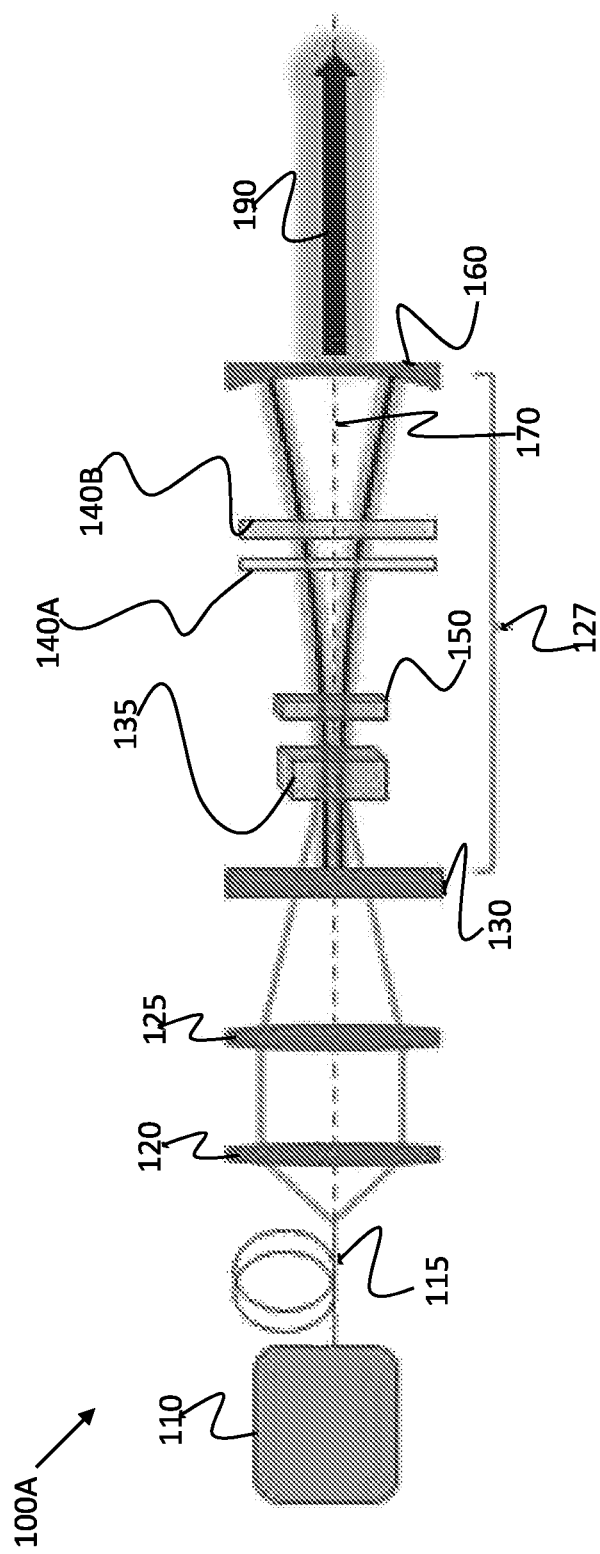
FIG. 2 is a schematic illustration of an exemplary laser system, according to certain exemplary embodiments of the subject matter.

Reference is now made to FIG. 1 showing a schematic illustration of an exemplary laser system, according to some exemplary embodiments of the subject matter. Another exemplary laser system, according to some exemplary embodiments of the subject matter, are illustrated in FIG. 2 and in FIG. 11. According to one aspect of the present invention, there is provided a laser system 100. Laser system 100 may comprise a pump source (e.g., pump diode) 110. The pump source may generate a population inversion within a gain medium, resulting in a spontaneous emission.

Non-limiting exemplary elements of pump sources are: continuous lamps, flashlamps, and lasers.

Pump diode 110 may be optically coupled to a fiber 115 e.g., by one or more optic element (e.g., lens 120) to generate a gain for a laser. Pump diode 110 may be operated in a continuous wave mode or quasi-continuous wave mode.

Pump diode 110 may be tuned to provide a beam having a wavelength which matches the corresponding absorption wavelength corresponding to transition from the ground state to the upper excited state of a gain medium as described below. There are various pump schemes and pumping configurations well known in the art and some of them may be applied to the present disclosure application. Pump diode 110 may include direct pumping, the pump diode may deliver into fiber 115. Optionally, the pump diode 110 configurations may include a side pump and an end pump.

Laser system 100 may comprise a gain medium 135. Gain medium 135 may be positioned within a laser cavity 127. Non-limiting exemplary gain media 135 are selected from materials (also referred to as "laser crystal") doped with a rare-earth element. Optionally, the material comprises a host crystal selected from, without being limited thereto, Yttrium Aluminum Garnet $Y_3Al_5O_{12}$ ("YAG"), and Yttrium Lithium Fluoride ("YLF"), Lithium Lutetium Fluoride (LiLuF), and Yttrium Aluminum Perovskite $YAlO_3$ ("YAP"). Optionally, the host crystal is doped with a rare earth element. Non-limiting exemplary rare elements are is selected from Chromium (Cr), Thulium (Tm), Holmium (Ho), Erbium (Er), or any combination thereof.

Optionally, the host crystal may be any acceptable crystalline host such as, but not limited to, $YAlO_3$ (YALO), $Y_3Al_5O_{12}$ (YAG), LuAG, YLF, and $Y_3(Sc_xAl_{2-x})Al_3O_{12}$ (YSAG).

Optionally, the host crystal may be a $Tm^{3+}$-doped crystal. Optionally, the Tm-doped crystals ions comprise Tm:YAP, and Tm:YLF crystals, allowing to create a laser emitting light in the 2 μm range.

Further non-limiting exemplary gain media 135 are selected from: Tm:YAG, Tm:$YVO_4$, Tm:YLF, Tm:YAP or Tm:LuAG. Optionally, the concentration of the $Tm^{3+}$ dopant in the host crystal material of the laser crystal is inversely proportional to the length of the laser crystal. Optionally, the concentration of $Tm^{3+}$ dopant is between about 0.2% to about 8%, by weight. Optionally, the laser crystal has dimensions ranging from 1×1×1 mm to 10×10×20 mm, from 2×2×10 mm to 4×4×10 mm. Optionally, the gain medium may be Tm:YAP or Tm:YLF.

The laser system 100 may comprise a first optical element 130 (e.g. an input mirror). Optionally, the laser system 100 may comprise one or more lenses, which may allow to optically couple the pump source 110 to the gain medium 135. Optionally such lenses may focus a beam emerging from the pump source 110, allowing a minimum spot size inside the gain medium 135 (e.g.100 to 500 μm). Optionally, laser system 100 may comprise a first collimation lens 120 and a second focusing lens 125.

Optical element 130 may be selected from a lens, a reflector, a mirror, e.g. a convex mirror, and a prism. Optical element 130 may be positioned in a light-path of a laser beam e.g., approximately along the longitudinal axis 190 of laser system 100. One or more from: optical element 130, first collimation lens 120, and a second focusing lens 125 may allow pump source 110 to be optically coupled to the gain medium 135. Optionally, optical element 130, first collimation lens 120, and a second focusing lens 125 may be positioned in a light-path of a laser beam.

Optionally, input mirror 130 may be located at the first end of laser cavity 127. Optionally, input mirror 130 may be configured to serve as a diverging optical element; either as a reflecting convex surface, as a plano element, or as a plano-concave optical element. The light striking the input mirror may diverge as it reflects back toward the gain medium. In some cavities, dependent upon gain medium, it may be beneficial to place an aperture adjacent to the input mirror so as to prevent high divergent light from reentering the gain (lasing) medium, e.g., due to waveguiding effects Optionally, input mirror 130 may include a first surface 122 and a second surface 123. Second surface 123 may be directed substantially towards the laser cavity 127 and gain medium 135. Optionally, second surface 123 may be coated with silver, a dielectric, or some similar coating to provide the high reflective properties e.g., in order to serve as input mirror. First surface 122 may be characterized as High Transmission ("HT") of the beam received from pump source 110. Optionally, surface 123 may be characterized as having high reflection ("HR") of the wavelength in the infra-red (IR) range, e.g., 1500-3500 nm, e.g., 1800-2200 nm. Optionally, surface 123 may be characterized as having a HT to the wavelength of the pump source 110 (e.g. 700-800 nm).

Laser system 100 may have one or more etalons (e.g., two) 140A and 140B, which are positioned a light-path of the laser beam. Optionally, one or more etalons comprise a first etalon 140A and a second etalon 140B. Optionally, the second etalon 140B is positioned next to the first etalon 140A, so as the first and the second etalons are positioned a light-path of the laser beam.

As used herein, "next" it is meant, that the second etalon is positioned in closed proximity to the first etalon, so that generated laser beam is transmitted through the first etalon and thereafter through the second etalon. Additionally, it should be clarified, that the laser system is devoid of any element disposed between the first etalon and the second etalon. Optionally, the etalons 140A and 140B are positioned along a horizontal axis 190 comprising gain medium 135. In some embodiments, horizontal axis 190 may be defined as up to ±60 degrees from the longitudinal axis.

Optionally, etalons 140A and 140B, provide a tunable spectral range and a narrow spectral bandwidth of the laser. Optionally, the transmission wavelength band of the laser light is dictated by reflectivity, a thickness, and a refractive index of etalons 140A and 140B, and thus a pulse width thereof is adjusted. Optionally, the tunability range is at least 10 nm, at least 14 nm, at least 20 nm, at least 25 nm, at least 30 nm, at least 35 nm. Optionally, the tunability range is from 8 to 50 nm, or, in some embodiments from 8 to 15 nm, or, in some embodiments from 10 to 15 nm, or, in some embodiments from 15 to 20 nm, or, in some embodiments from 20 to 30 nm, or, in some embodiments from 30 to 35 nm, or, in some embodiments from 35 to 40 nm.

The tunability range may depend on the wavelength of the emitted light. Optionally, the tunability range may depend on reflectance degree of the output coupler, and/or transmission degree of the saturable absorber.

Optionally, etalon 140A is thinner than etalon 140B. Optionally, etalon 140A has a thickness of 1 to 100 μm, or, in some embodiments, from 10 to 40 μm, or, in some embodiments, from 20 to 30 μm or, in some embodiments, from 30 to 40 μm or, in some embodiments, from 40 to 60 μm or, in some embodiments, from 60 to 100 μm. In some embodiments, etalon 140A has a thickness of 5, 10, 15, 20, 25, 30, 35, 40, 45, or 50 μm, including any value and range therebetween.

Optionally, etalon 140B has a thickness of 100 to 600 μm, or, in some embodiments, from 200 to 600 μm, or, in some embodiments, from 300 to 600 μm. Optionally, etalon 140B has a thickness of 100, 150, 200, 250, 300, 350, 400, 450, 500, 550, or 600 μm, including any value and range therebetween.

Optionally, a thickness ratio of etalon 140A to etalon 140B is from 1:5 to 1:40, respectively. Optionally, a thickness ratio of etalon 140A to etalon 140B is 1:5, 1:10, 1:15, 1:20, 1:25, 1:30, 1:35, or 1:40, respectively, including any value and range therebetween.

Without being bound by any particular theory or mechanism, it is assumed that the thinner etalon allows tunability of the spectral range. The thinner is etalon thickness, the wider the spectral range tunability. Further, the tunability range matches the amplification curve of the gain medium. Further, and without being bound by any particular theory or mechanism, it is assumed that the thicker etalon response for the spectral bandwidth narrowing, with the maximum thickness being limited to avoid the occurrence of two spatial adjacent modes. Taken together, the use of two etalons provides both features of spectral range tunability and spectral bandwidth narrowing.

Optionally, etalon 140A or etalon 140B may comprise a full or a partial reflecting material e.g., in the form of a coating 145, for example as described below under "Exemplary configuration".

Optionally, laser system 100 may have a Q-switching element 150, which may allow to operate the laser system 100 in pulsed mode. Q-switching element 150 may be a passive Q switching element, or alternatively, an active Q-switching element.

Active Q-switching element may be optionally an optical modulation unit, optionally positioned within a resonator. Optionally, an acousto-optic modulator (AOM), an electro-optic modulator (EOM), or an acousto-optic tunable filter (AOTF) may be included as an optical modulator in the optical modulation unit.

Optionally, laser system 100 may have a Q-switching element such as acousto-optic modulator (AOM) 150. AOM 150 may be positioned in a light-path of the laser beam e.g., proximately along the longitudinal axis of the laser system 100. In one exemplary configuration, AOM 150 may be positioned at the second end of laser cavity 127, between the etalon 140B and OC 160. In other exemplary configuration, AOM 150 may be positioned between the gain medium 135 and the etalon 140A. Optionally, the length of the laser cavity 127 may be within a range of 1-500 mm, e.g., about 100 to 250 mm.

AOM 150 may be configured to receive and modulate a seed laser beam. Optionally, the laser beam may be arranged to be generally incident at the Bragg angle to AOM 150. AOM 150 may allow to produce a pulsed output beam. Further, AOM 150 may control the timing of the release of the pulse from the seed laser.

In another configuration, laser system 100 has a passive Q-switching element instead of AOM 150. Passive Q-switching element may be configured to provide passive pulse switching of the laser beam.

Optionally, a passive Q-switching element is saturable absorber (SA). Such laser provide with a passive Q-switching element may be a widespread technique to produce short pulse laser beams.

Optionally, SA comprises a semiconductor. Optionally, SA comprises a quantum dot. Optionally, SA comprises a doped crystal. Non-limiting exemplary doped crystals are selected from: chromium (II) doped zinc selenide (Cr:ZnSe) and chromium (II) doped zinc sulfide (Cr:ZnS). Optionally, the w/w (weight per weight) concentration of Cr2+ dopant in a doped crystal is between about 1% to about 20%, or optionally from 9 to 13%. In some cases, Cr:ZnSe and Cr:ZnS SA may have a relatively high absorption cross-sections, thus not requiring a focusing mode to a small area on the SA. This may provide more flexibility with respect of the resonator. Optionally, the Cr:ZnSe and the Cr:ZnS SA have a low saturable intensity, which may lead to reduced risk of damage during Q-switched operation. Optionally, the Cr:ZnS crystal SA may be applied in several passive Q-switch ("PQS") lasers, e.g. Ho:YAG, Tm:KY(WO$_4$), Tm:KLu(WO$_4$), or the like.

Laser system 100 may have an output coupler (OC) 160. OC 160 may be positioned at the second end of laser cavity 127. Optionally, OC may be positioned in a light-path of the laser beam. OC 160 may transmit a portion of the optical power in the intracavity beam 170 outside the laser cavity to form the output beam. OC 160 may be a component of an optical resonator that allows the extraction of a portion of the light from the laser's intracavity beam. OC 160 may have a partially reflective (PR) coating, allowing a certain portion of the intracavity beam to transmit through. OC may have a PR coating for a wavelength in the range of 1800-2200 nm. Optionally, PR coating has a reflectance in the range of 50-90%.

Optionally, the gain medium 135, the pump source 110, the input mirror 130, the output coupler 160, the first etalon 140A, the second etalon 140B, and the q-switching element 150 are at a light-pass of the laser beam.

Optionally, OC may be a plano-concave mirror. Optionally, the curvature radius of the plano-concave mirror may range from 100 to 400 mm, from 150 to 250 mm. Optionally, laser system 100 may have a housing. The housing may be made of a rigid, durable material, such as, without limitation, aluminum, stainless steel, a hard polymer and/or the like. The housing may have a cylindrical, conical, rectangular or any other suitable shape. The housing may prevent unwanted foreign elements from entering thereto.

Exemplary Configuration

In certain embodiments, laser system 100 may be monitored via a monitoring system. Monitoring system may provide a manner for monitoring and obtaining experimental data from the laser system 100 according to its output. Monitoring system may comprise an optical filter, which may be optically connected to laser cavity 127 at least partially by free space light propagation.

In some exemplary embodiments of the subject, pump diode 110 is composed of a 793 nm fiber-coupled laser diode having a 105 μm core diameter (numerical aperture is 0.22). The emitted wavelength may be tuned to the absorption peak corresponding to the $^3H_6 \rightarrow {}^3H_4$ transition for Tm doped gain medium (e.g. when Tm:YLF is used for gain medium). Optionally, the emitted wavelength of the pump source may be tuned to the absorption wavelength corresponding to $^3H_6 \rightarrow {}^3F_4$ transition of a gain medium (e.g. when Tm:YAP is used for gain medium). Optionally, the emitted wavelength of the pump source may be temperature tuned.

A 3.5% doped Tm:YLF crystal, 9 mm long and having a 3×3 mm cross-section was used as the gain medium 135. The laser crystal is anti-reflection (AR) coated at both the pump 110 and laser wavelengths. The crystal 135 is wrapped in indium foil and fastened into an aluminum holder water cooled by a chiller at 18° C.

The pump beam is delivered and focused in the laser crystal Tm:YLF crystal (gain medium 135), using a pair of anti-reflection (AR) coated at 650-1050 nm, bi-convex first collimation lens 120. The obtained spot size inside the Tm:YLF crystal is about 250 μm diameter. The Tm:YLF crystal may absorb about 67% from the pump power. An end-pumped architecture was implemented for cavity 127. Optical element (input mirror) 130 is rear cavity plano-plano mirror, having an AR coating at the pump wavelength, and a high reflectance (HR) coating for the 1850-2000 nm.

Further non-limiting embodiments of input mirror 130, first surface 122, and second surface 123 are described above.

OC 160 may be a plano-concave mirror with a 200 mm radius of curvature. The OC is partially reflecting (PR) coated with 70% reflectance between 1850-2000 nm. The distance between the two mirrors (first mirror and OC) is 200 mm.

For the pulsed operation, a water cooled AOM 150 is made of 45 mm long fused silica was used as an active Q-switch and operated at a radio frequency of 68 MHz.

Two etalons 140A and 140B comprise uncoated Yttrium Aluminum Garnet (YAG), with 500 μm (140B) and 25 μm (140A) thicknesses fixed on an intra cavity rotating stage. The Etalons' transmission is based on Fresnel reflections (8.2% from each surface). The transmission depends on wavelength, varying over the spectrum of between 72% to 100% for each of Etalons 140A and 140B. The use of two etalon plates may enable to achieve narrow spectral bandwidth, without reducing the tunability range. The thinner etalon 140A may be responsible for the wide tuning range due to its free spectral range (FSR) of 39 nm, while the thicker Etalon may define the spectral bandwidth.

The transmission spectrum may vary inversely to the etalon's angle, determining which wavelength will have the maximal transmission. By rotating the 25 μm etalon 140A it is possible to control the spectral losses. The output power may be measured, after filtering the residual pump power, using a power meter (Ophir, L50(150)A-35). The laser spectrum may be acquired by an Optical Spectrum Analyzer OSA (Thorlabs, OSA205C).

The pulse energy may be measured using an energy meter (Ophir, PE50-C). The pulse temporal characterization may be obtained using 12.5 GHz extended InGaAs Photodetectors (EOT, ET-5000) and 100 MHz oscilloscope (Agilent, DSO-X 2012A).

The Method

In some embodiments, there is provided a method of producing a pulsed laser beam.

Figure 14:
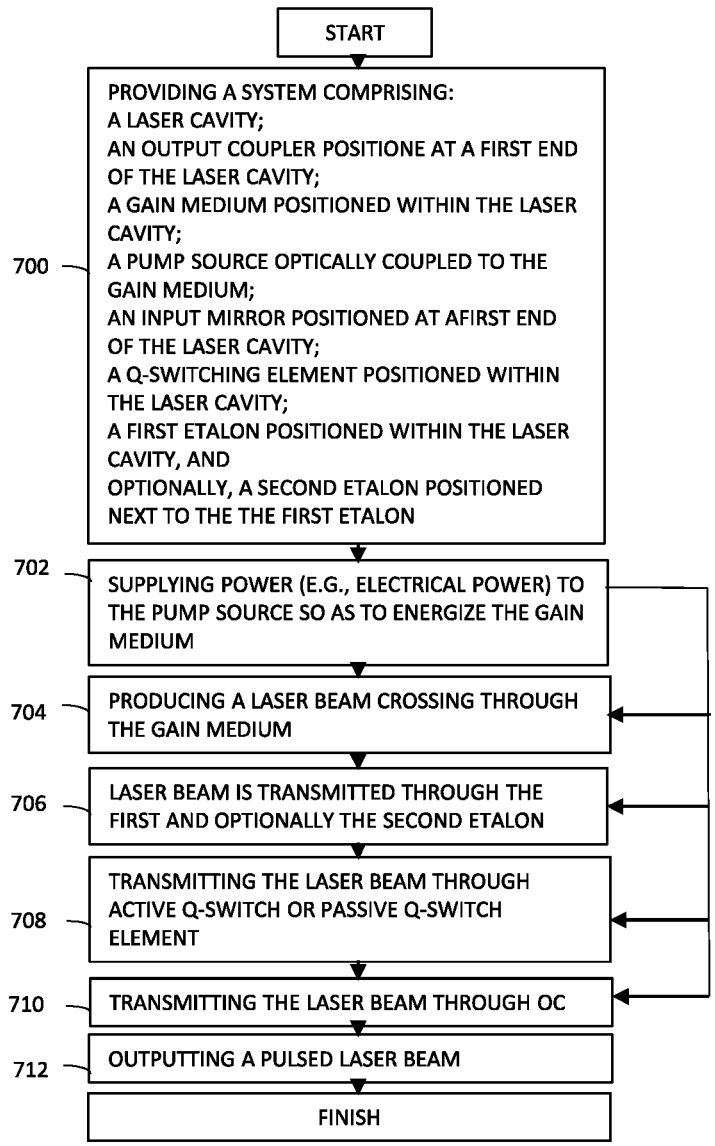
FIG. 14 illustrates a flowchart of an exemplary method for producing a pulsed laser beam according to some non-limiting embodiments of the invention.

Reference is now made to FIG. 14, which shows an optional flowchart of the method for producing a pulsed laser beam according to some embodiments of the present invention.

In Some Embodiments, the Method Comprises the Steps of:
(i) providing the laser system discussed above, which comprises:
a laser cavity;
an input mirror positioned at a first end of the laser cavity;
an output coupler positioned at a second end of the laser cavity;
a gain medium positioned within the laser cavity;
a pump source optically coupled to the gain medium;
a first etalon positioned within the laser cavity;
a q-switching element positioned within the laser cavity;
and optionally a second etalon positioned within the laser cavity, wherein the gain medium, the pump source, the input mirror, the output coupler, the first etalon, the q-switching element, and optionally the second etalon are at a light-pass of a laser beam (step 700);
supplying power (e.g., electrical power) to the pump source so as to energize the gain medium (step 702).

In some embodiments, the system comprises two etalons, wherein the first etalon is positioned between the gain medium and the second etalon, and the second etalon is positioned between the first etalon and the q-switching element. In some embodiments, the q-switching element is positioned between the second etalon and the output coupler (OC).

Upon Supplying the Power:
a laser beam crossing through the gain medium may be produced (step 704); and thereafter the laser beam is transmitted through first etalon and optionally through the second etalon (step 706); and thereafter the laser beam is transmitted through an active or a passive q-switching element (step 708).

The pulsed mode of the laser may be obtained by the passive q-switching element, or by the active q-switching element, e.g., the optical modulation unit, optionally within a resonator. An acousto-optic modulator (AOM), an electrooptic modulator (EOM), or an acousto-optic tunable filter (AOTF) may be included as an optical modulator in the optical modulation unit.

Thereafter, the laser beam may pass through OC (step 710), thereby outputting a pulsed laser beam from the laser cavity (step 712).

In some embodiments, the pump source is in operable communication with the input mirror.

Figure 15:
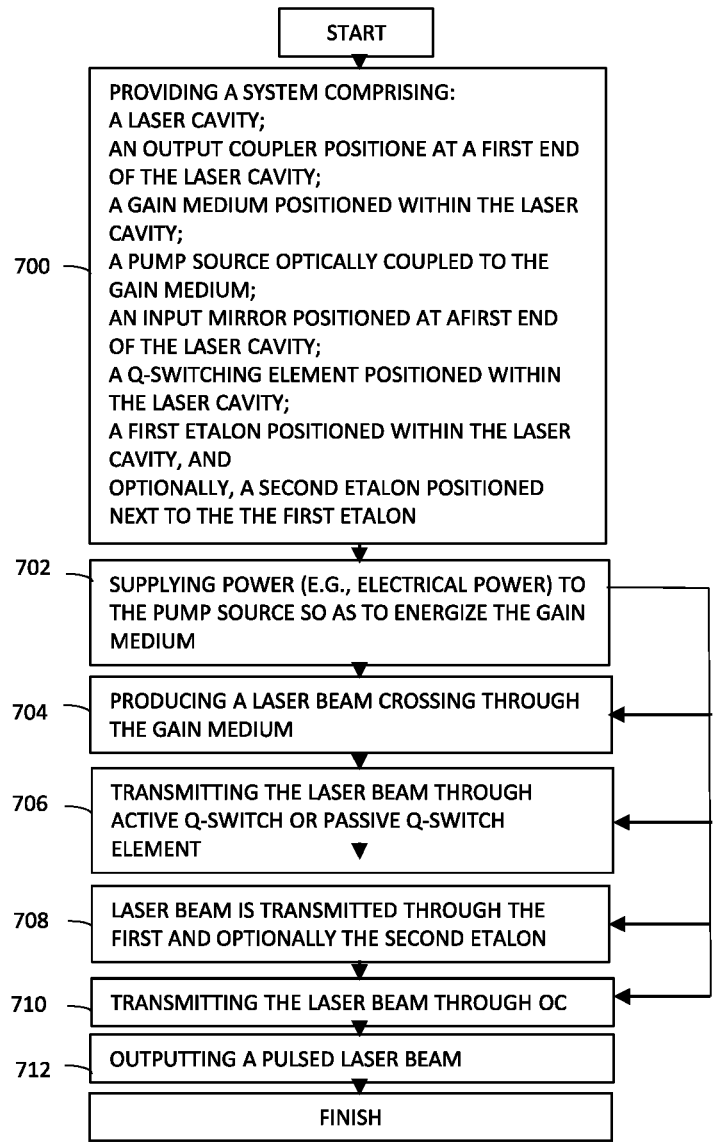
FIG. 15 illustrates a flowchart of an exemplary method for producing a pulsed laser beam according to some non-limiting embodiments of the invention.

Reference is now made to FIG. 15, which shows another optional flowchart of the method for producing a pulsed laser beam according to some embodiments of the present invention.

In Some Embodiments, the Method Comprises the Steps of:
(i) providing the laser system discussed above, which comprises:
a laser cavity;
an input mirror positioned at a first end of the laser cavity;
an output coupler positioned at a second end of the laser cavity;
a gain medium positioned within the laser cavity;
a pump source optically coupled to the gain medium;
a first etalon positioned within the laser cavity;
a q-switching element positioned within the laser cavity;
and optionally a second etalon positioned within the laser cavity, wherein the gain medium, the pump source, the input mirror, the output coupler, the first etalon, the q-switching element, and optionally the second etalon are at a light-pass of a laser beam (step 700);
supplying power (e.g., electrical power) to the pump source so as to energize the gain medium (step 702).

In some embodiments, the q-switching element is positioned between the gain medium and the first etalon, the first etalon is positioned between the q-switching element and the second etalon, and the second etalon is positioned between the first etalon and OC.

Upon Supplying the Power:
a laser beam crossing through the gain medium may be produced (step 704); and thereafter the laser beam is transmitted through an active or a passive q-switching element (step 706); and through the first etalon and thereafter through the second etalon (step 708).

The pulsed mode of the laser may be obtained by the passive q-switching element, or by the active q-switching element, e.g., the optical modulation unit, optionally within a resonator. An acousto-optic modulator (AOM), an electrooptic modulator (EOM), or an acousto-optic tunable filter (AOTF) may be included as an optical modulator in the optical modulation unit.

Thereafter, the laser beam may pass through OC (step 710), thereby outputting a pulsed laser beam from the laser cavity (step 712).

In some embodiments, the pump source is in operable communication with the input mirror.

Figure 13:
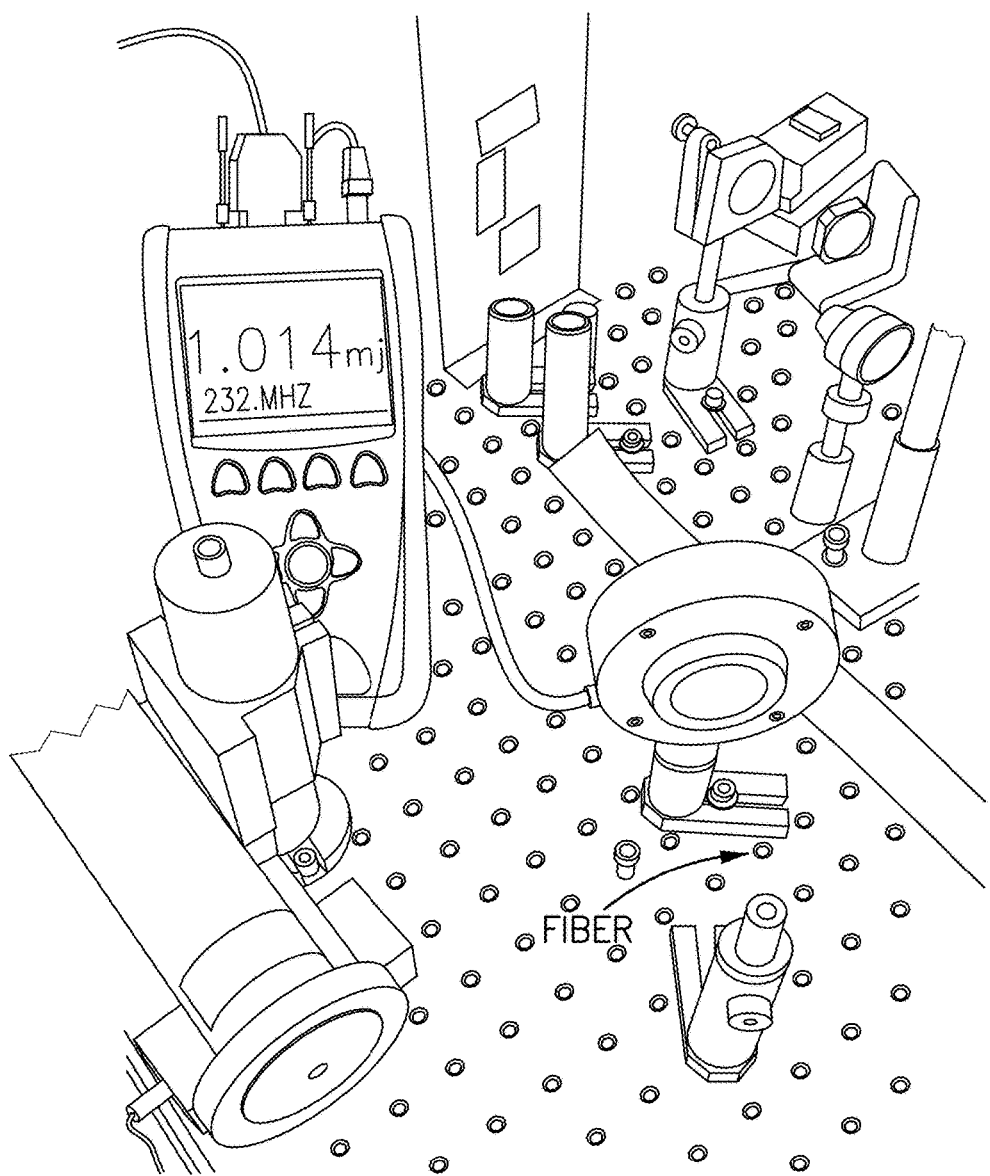
FIG. 13 illustrates an exemplary laser system, coupled to a multimode fiber.
Figure 13:
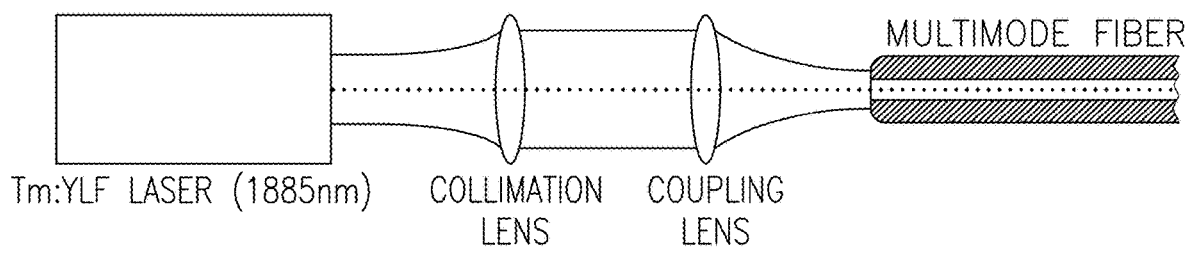

In some embodiments, the laser beam is further optically coupled to an optical fiber, to enable fiber delivery of the laser beam (FIG. 13). There are various optical fibers well known in the art and some of them may be applied to the present application.

In some embodiments, the laser beam is characterized by a wavelength of, for example, infrared (IR) spectrum. Without being bound by any particular mechanism, the wavelength range may be dictated depending on the active ions on the gain medium. For example, and without limitation, for Tm-doped medium, the range may vary from 1700 to 2100 nm; for Ho-doped medium, the range may vary from 2000 to 2200 nm; for Cr-doped medium, the range can vary from 2200 to 2700 nm, or from 2700 to 3000 nm e.g., for Er doped medium.

In some embodiments, the laser beam is characterized by wavelength in the range from 1800 to 2100 nm, from 1900 to 2000 nm.

In some embodiments, the pulsed laser beam is characterized by energy of at least 0.8 mJ. In some embodiments, the pulsed laser beam is characterized by energy of at least 1 mJ. In some embodiments, the pulsed laser beam is characterized by energy of at least 2 mJ. In some embodiments, the pulsed laser beam is characterized by energy of at least 3 mJ. In some embodiments, the pulsed laser beam is characterized by energy of at least 4 mJ. In some embodiments, the pulsed laser beam is characterized by energy of at least 4.5 mJ.

In some embodiments, the pulsed laser beam energy is in the range of 1 to 10 mJ. In some embodiments, the pulsed laser beam energy is 1, 2, 3, 4, 5, 6, 7, 8, 9, or 10 mJ, including any value and range therebetween.

In some embodiments, the pulse of the laser beam is characterized by duration of: 5 to 10, 10 to 20, 20 to 30, 30 to 40, or 30 to 50 nanoseconds at an overall pulse energy of 1 to 10 milliJoule, and at a wavelength of 1800 to 2000 nm.

In some embodiments, the laser spectral bandwidth is 0.1 to 0.5 nm FWHM, e.g., 0.1, 0.2, 0.3, 0.4, or 0.5 nm FWHM, including any value and range therebetween.

In some embodiments, the electrical power is supplied at 1 to 50 Watts. In some embodiments, the electrical power is supplied at 1 to 40 Watts. In some embodiments, the electrical power is supplied at 1 to 30 Watts. In some embodiments, the electrical power is supplied at 2 to 30 Watts. In some embodiments, the electrical power is supplied at 3 to 30 Watts. In some embodiments, the electrical power is supplied at 1, 5, 10, 15, 20, 25, 30, 35, 40, 45, or 50 Watts, including any value and range therebetween.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

General

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

In some exemplary procedures describing Tm:YLF laser, a laser system as described above in "Exemplary configuration" was used. In some exemplary procedures describing Tm:YAP laser, a laser configuration as described in FIG. 2 was used.

In one optional configuration, illustrating an exemplary embodiment of the invention there is provided a Tm:YLF based laser system (as exemplified by FIG. 1). The Tm:YLF laser performance for the continuous wave (CW) operation without the intra-cavity Etalons, can be seen in FIG. 3A as a function of the absorbed pump power. An absorbed pump power at the lasing threshold of 1.9 W was obtained. A maximum output power of 4.57 W was measured at 11.9 W absorbed pump power, corresponding to an optical-to-optical conversion of 23.3%, and a 42.9% slope efficiency.

The measured lasing wavelength was 1885 nm, with a spectral width of 1.4 nm at Width at Half Maximum (FWHM). After inserting the Etalon pair in the laser cavity, the laser achieved a maximum output power of 4.05 W corresponding to an optical-to-optical conversion of 20.6%, and a 38% slope efficiency at the 1879 nm lasing wavelength FIG. 4A.

Figure 4A:
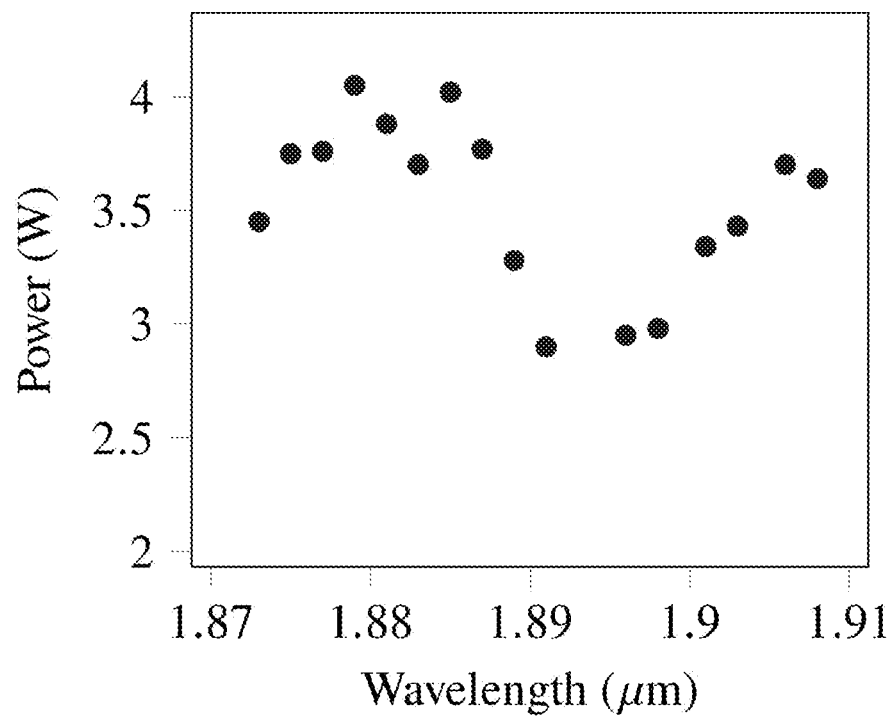
FIGS. 4A-B present graphs showing the laser tunability performance; Tm:YLF spectral tuning in CW (FIG. 4A) and in pulsed mode (FIG. 4B).

The laser wavelength was tuned, in the CW setup, from 1873 to 1908 nm as shown in FIG. 4A achieving a continuous tuning range of 35 nm. Along the entire tuning range, the measured output power did not fall from 2.9 W at an absorbed pump power of 11.9W, as shown in FIG. 4A.

For this narrowed bandwidth tuning operation, a maximum output power of 4.05 W was achieved at a wavelength of 1879 nm. In active Q switched (AQS) mode, a 1 KHz repetition rate was chosen. The laser average output power for the Free-running (without etalon) pulsed operation is shown in FIG. 3B.

Figure 5A:
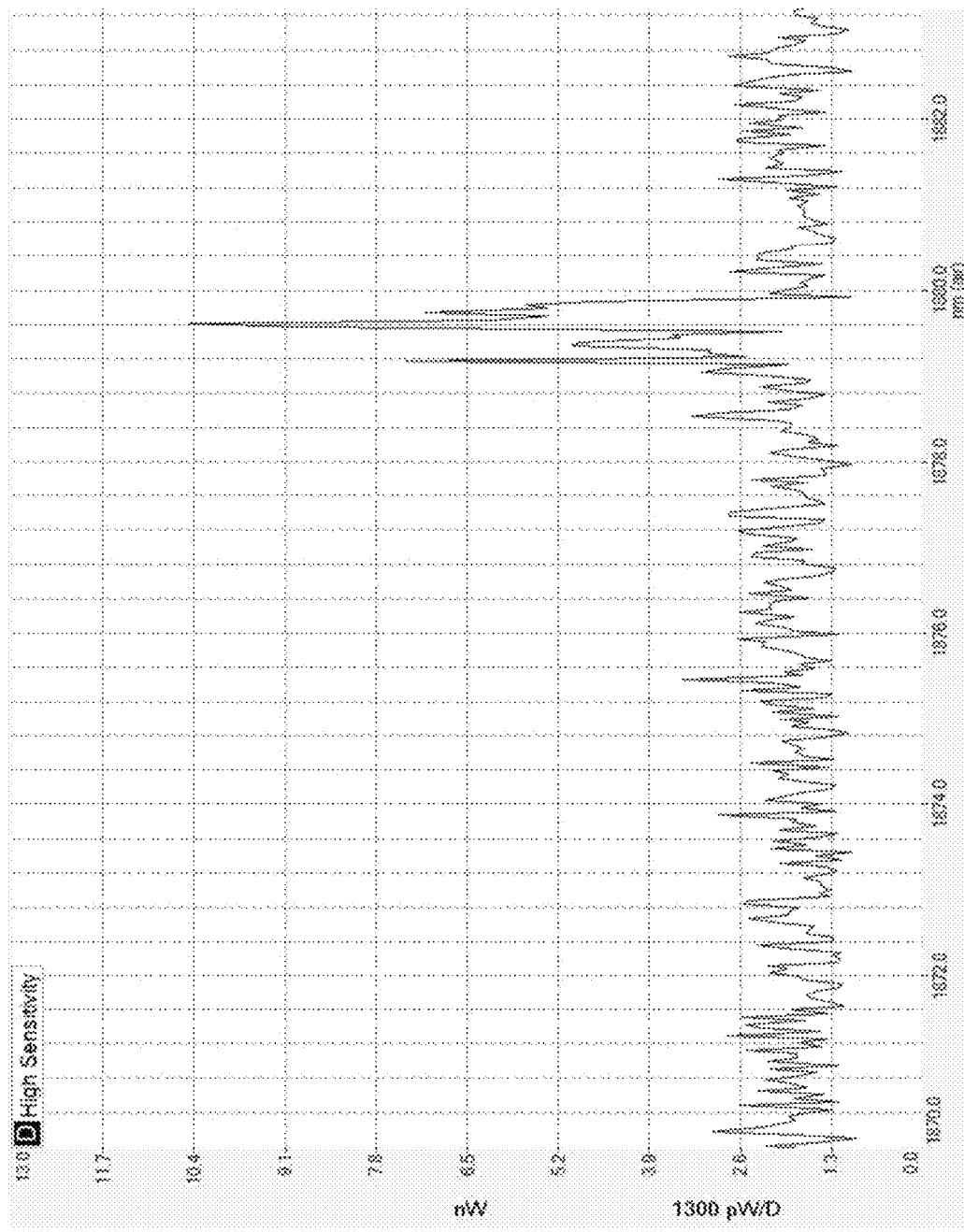
FIGS. 5A-B present graphs showing Tm:YLF spectral bandwidth without (FIG. 5A) and with (FIG. 5B) Etalon plates.
Figure 5B:
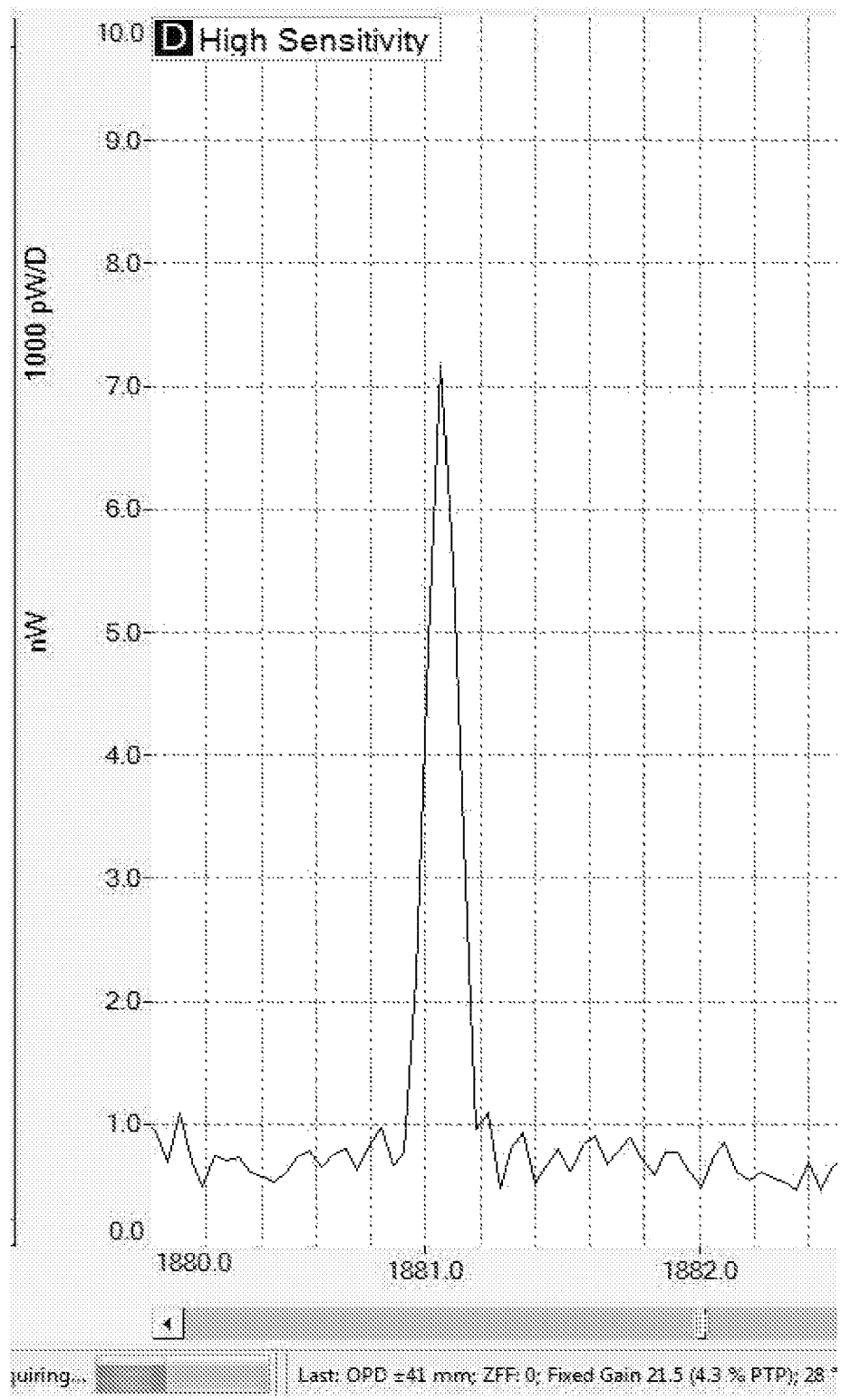
Figure 6A:
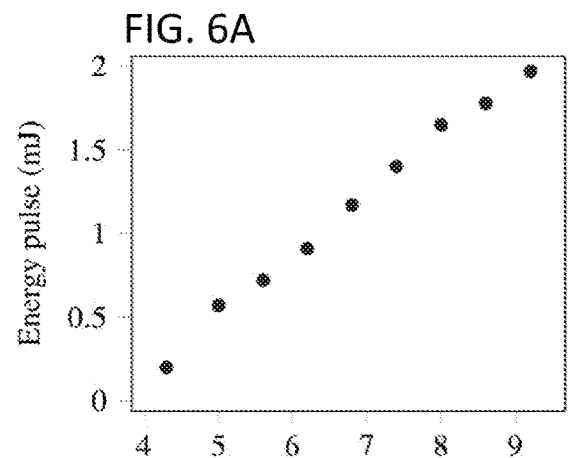
FIGS. 6A-F present graphs showing laser performances in pulsed mode (Energy pulse—FIGS. 6A, 6D; Pulse duration—FIGS. 6B, 6E; Peak power—FIGS. 6C, 6F), with Etalon plates (FIGS. 6A, 6B, 6C) and without Etalon plates (FIGS. 6D, 6E, 6F).
Figure 6D:
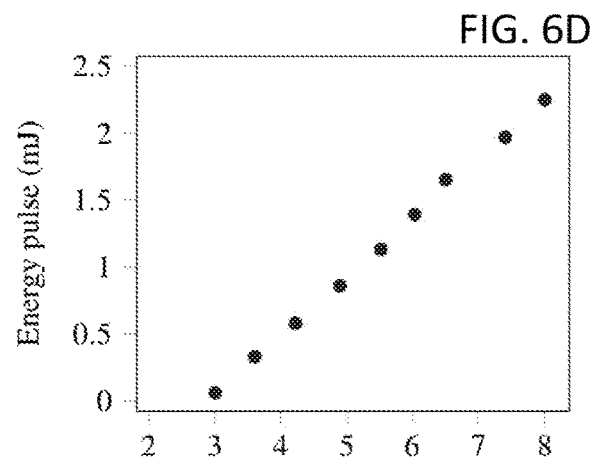
Figure 6B:
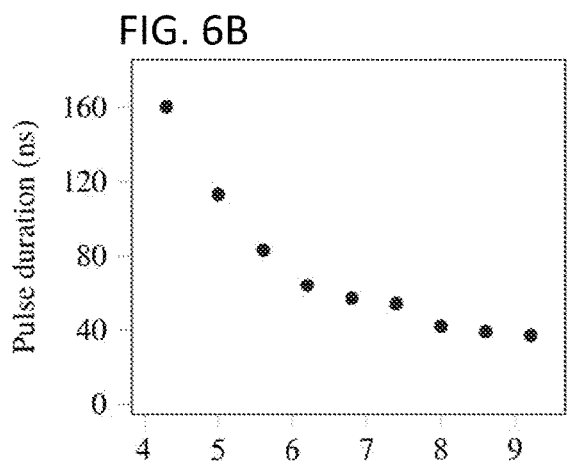
Figure 6E:
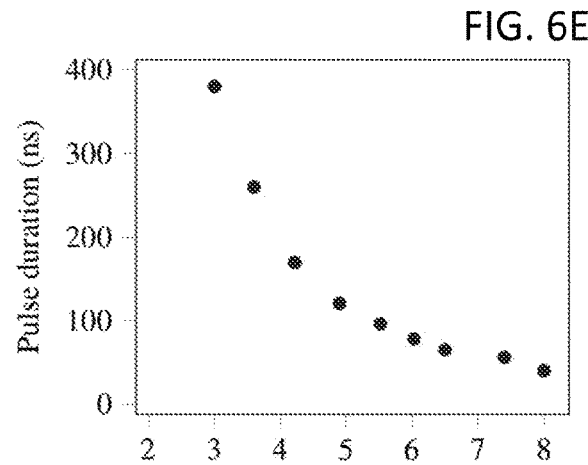
Figure 6C:
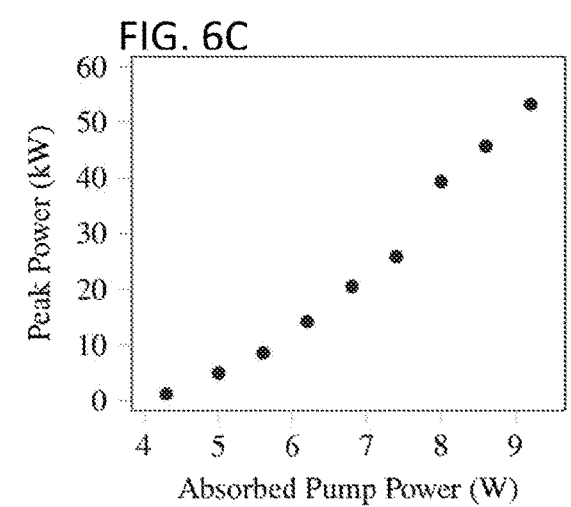
Figure 6F:
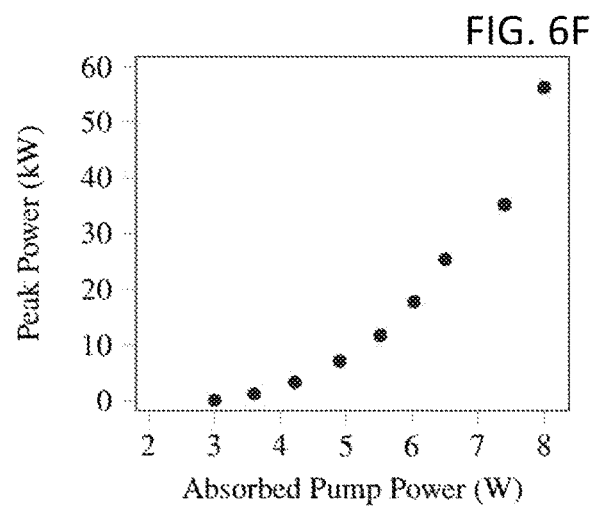

The laser threshold occurred at an absorbed pump power of 3 W. A maximum average output power of 2.25 W was achieved at an absorbed pump power of 8 W, corresponding to an optical-to-optical conversion of 18.3%, and a 44% slope efficiency. The measured emission wavelength was of 1985 nm, and the spectral width was 1.4 nm FWHM, as shown in FIG. 5A. A maximum output energy of 2.25 mJ was measured, having a pulse duration of 40 ns, corresponding to a peak power of 56.2 KW shown in FIGS. 6A-E. After inserting the Etalon pair inside the laser cavity, the laser operated at an absorbed pump power threshold of 3.6 W, resulting in a maximum average output power of 1.97 W under an absorbed pump power of 9.2 W, as shown in FIG. 3B, corresponding to an energy output of 1.97 mJ to an optical-to-optical conversion of 13.7%, and a 36% slope efficiency. The pulse duration obtained was 37 nsec, corresponding to a maximum peak power of 53.2 KW.

Figure 4B:
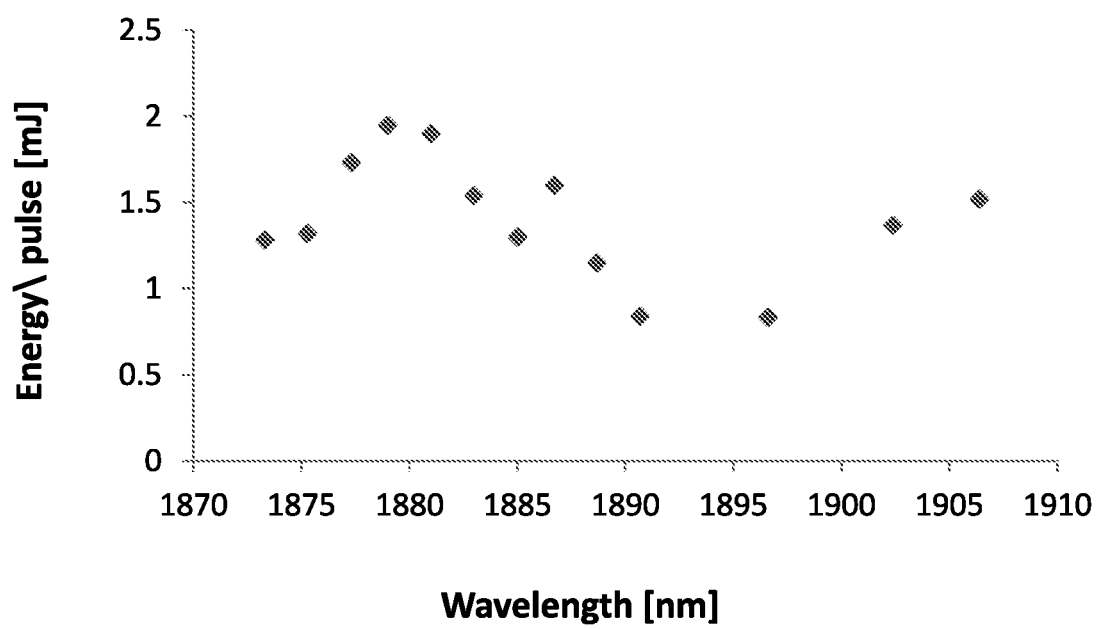
Figure 7:
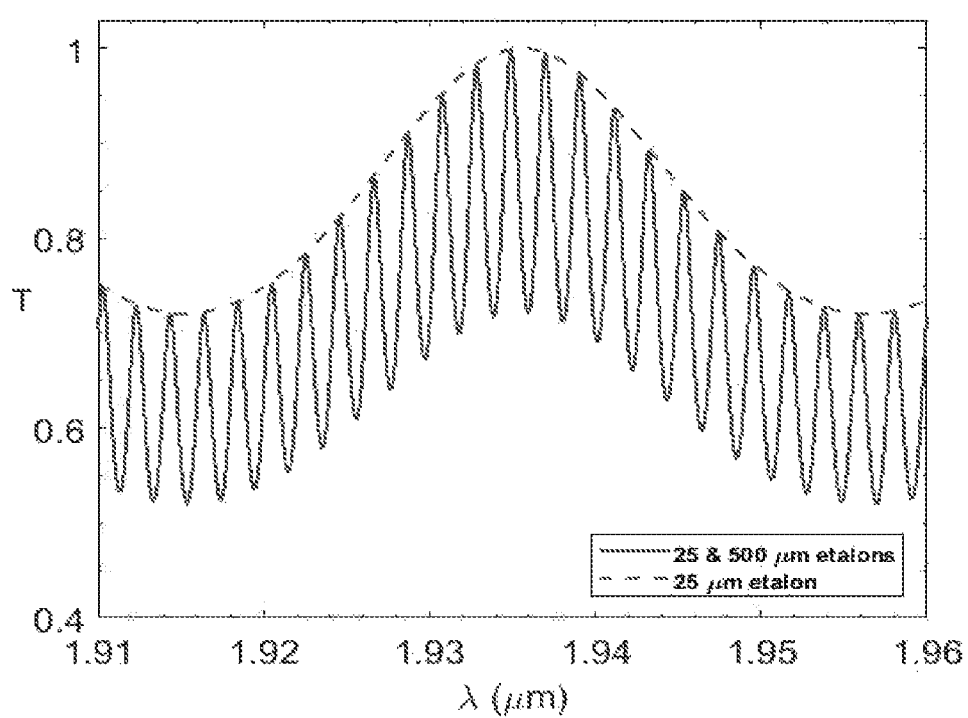
FIG. 7 presents a graph showing a free spectral transmission range superimposed for a pair of 25 and 500 μm Etalon's thicknesses (solid line), compared to the transmission of a single 25 μm Etalon plate (dashed line), with the 25 μm Etalon's angle being optimal for λ=1935 nm lasing.

The laser energy, pulse duration and peak power for both operation modes are shown in FIGS. 6A-E. The laser spectral bandwidth was narrowed to 0.15 nm FWHM. This bandwidth was achieved along the whole tunable spectrum, for both the CW and actively Q switched laser as shown in FIG. 4B. Compared to the CW operation, the spectral tuning range in the pulsed operation was slightly narrowed, from 35 nm in CW to 33 nm in pulsed mode, and ranged from 1873 to 1906 nm. The tuning range achieved in both cases agrees closely with the 39 nm calculated free spectral range (FSR), of the 25 µm thick Etalon plate, as shown in FIG. 7. This shows that the measured tuning range was mainly limited by the Etalon pair, and it is suggested that a broader spectral range could be obtained by selecting a thicker Etalon. Along the entire spectral range, the output energy measured did not fall from 0.83 mJ for a constant maximum absorbed pump power of 8.6 W as shown in FIG. 4B.

Figure 3A:
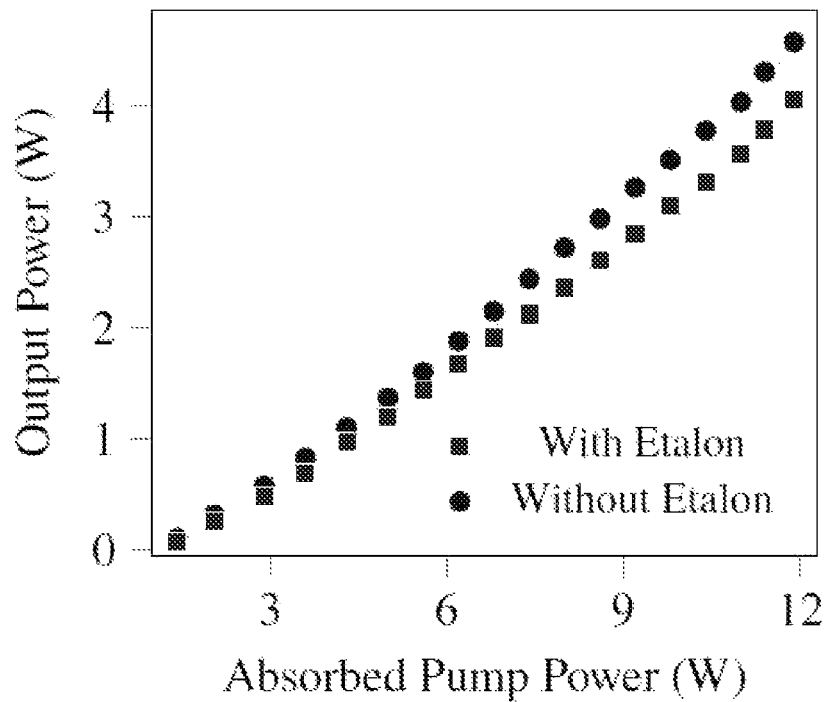
FIGS. 3A-B present graphs showing the Tm:YLF output power with and without Etalon plates in continuous wave mode (CW) (FIG. 3A) and in pulsed mode (FIG. 3B).
Figure 3B:
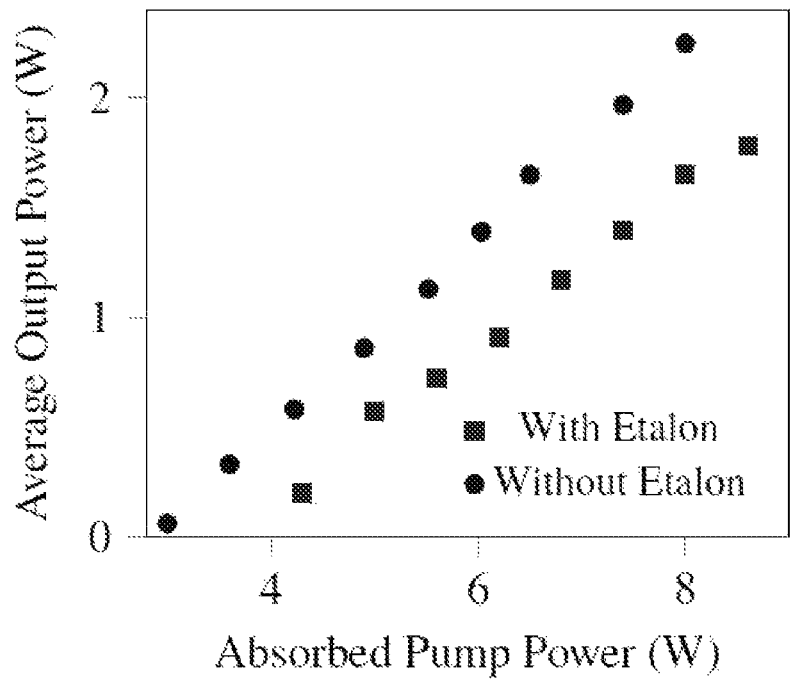

The Tm:YLF laser performance for the continuous wave (CW) operation without the intra-cavity Etalons, can be seen in FIG. 3A as a function of the absorbed pump power. An absorbed pump power at the lasing threshold of 1.9 W was obtained. A maximum output power of 4.57 W was measured at 11.9 W absorbed pump power, corresponding to an optical-to-optical conversion of 23.3%, and a 42.9% slope efficiency.

The measured lasing wavelength was 1885 nm, with a spectral width of 1.4 nm at Width at Half Maximum (FWHM).

In another optional configuration, illustrating an exemplary embodiment of the invention there is provided a Tm:YAP based laser system (as exemplified by FIG. 2).

The Tm:YAP (AQS) laser setup is shown in FIG. 2. The pumping source (110) is a fiber-coupled (115) laser diode emitting up to 15.8 W at 793 nm with a 105 µm core diameter and N.A of 0.22. The emitted wavelength was temperature tuned to the absorption peak corresponding to the $^3H_6 \rightarrow ^3F_4$ transition. The pump beam was focused using a pair of antireflection (AR) coated at 650-1050 nm bi-convex lenses (120, 125) on the Tm:YAP crystal (135), allowing a minimum spot size inside the Tm:YAP crystal of about 260 µm. The pump was delivered through a plano-plano rear cavity input mirror (130), having AR coating for the pump wavelength and high reflectance (HR) coating for the 1850-2000 nm. We used a plano-concave mirror with ROC of 200 mm as output coupler (OC) 160. The OC 160 was partially reflecting (PR) coated with 70% reflectance for the 1850-2000 nm. The total cavity length (127) was 220 mm. A c-cut Tm:YAP crystal (135) having a 3 atomic % Tm concentration doping, was 10 mm long while having a cross-section of 3×3 mm. The laser crystal (135) was AR coated for both the pump and laser wavelengths, wrapped in indium foil and fasten into an aluminum holder cooled by a water chiller at a stable 18° C. An active pulse switching was achieved by inserting AOM (150) into the laser cavity (127). Two uncoated YAG Etalon plates, with 500 µm (140B) and 25 µm (140A) thicknesses were fixed on a rotating stage intra-cavity and placed between the AOM (150) and the OC 160.

Figures 8A, 8B:
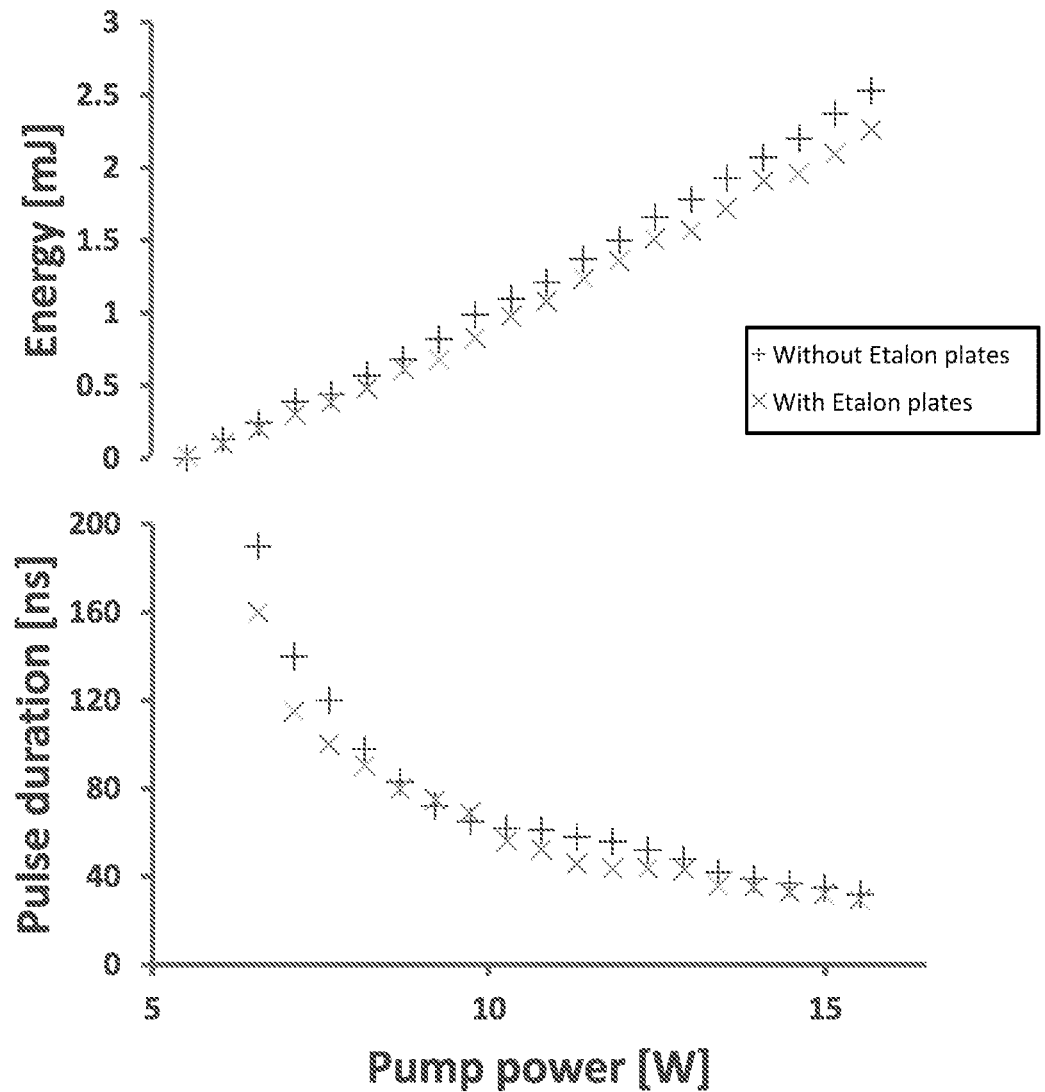
FIGS. 8A-C present graphs showing performances of AQS Tm:YAP laser (AOM frequency=1 kHZ, λ=1935 nm, spectral bandwidth=0.15 nm), with and without Etalon plates.
Figure 8C:
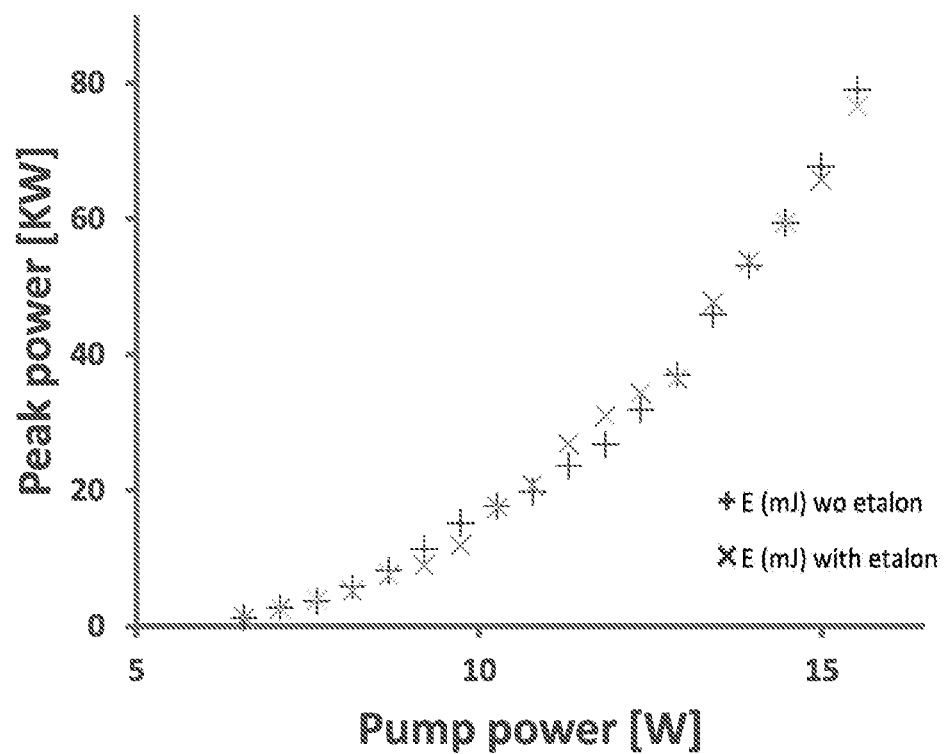

The Tm:YAP laser performance for the AQS operation with and without the intra-cavity etalons, can be seen in FIG. 8 as a function of the absorbed pump power. A maximum pulse energy of 2.25 mJ was measured at 8 W absorbed pump power, having a pulse duration of 40 ns and peak power of about 80 KW as shown in FIGS. 8A-C. The laser performance was measured at a wavelength of 1935 nm and at AOM frequency of 1 KHz.

Figure 9A:
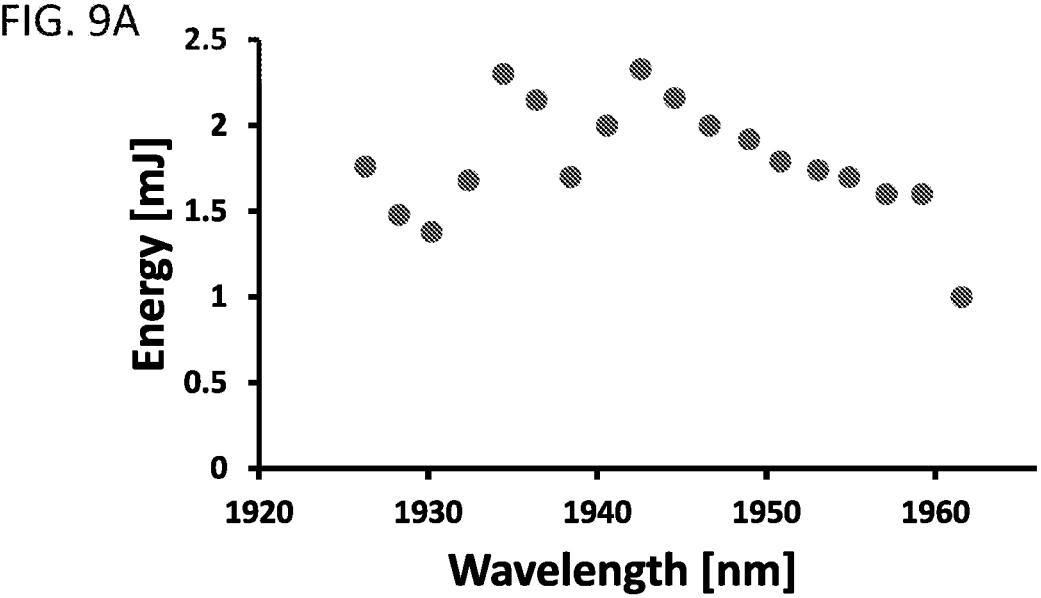
FIGS. 9A-B present graphs showing the tunability performance (FIG. 9A) and spectral width (FIG. 9B) of AQS Tm:YAP laser.
Figure 9B:
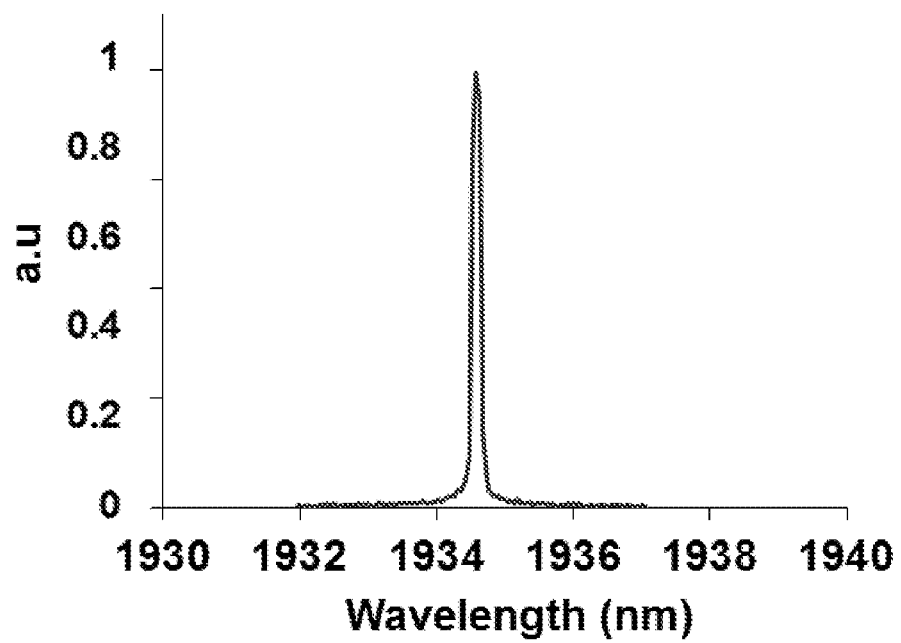

The measured lasing wavelength was 1935 nm, with a spectral width of 150 µm at Width at Half Maximum (FWHM) (FIG. 9B). The laser wavelength was tuned, in the AQS mode, from 1925 to 1960 nm as shown in FIG. 9A achieving a continuous tuning range of 35 nm. Along the entire tuning range, the measured pulse energy did not fall from below 0.83 mJ, as shown in FIG. 9A.

The Tm:YAP passive Q-switched (PQS) laser system is configured as described for the AQS Tm:YAP laser, with passive q-switching SA (Cr:ZnS crystal, 2×4×4 mm, 89% transmission) replacing the AOM.

The Tm:YAP laser performance for the PQS operation, using OC with 70 and 85% reflection, can be seen in FIG. 10 as a function of the absorbed pump power.

Figure 10A:
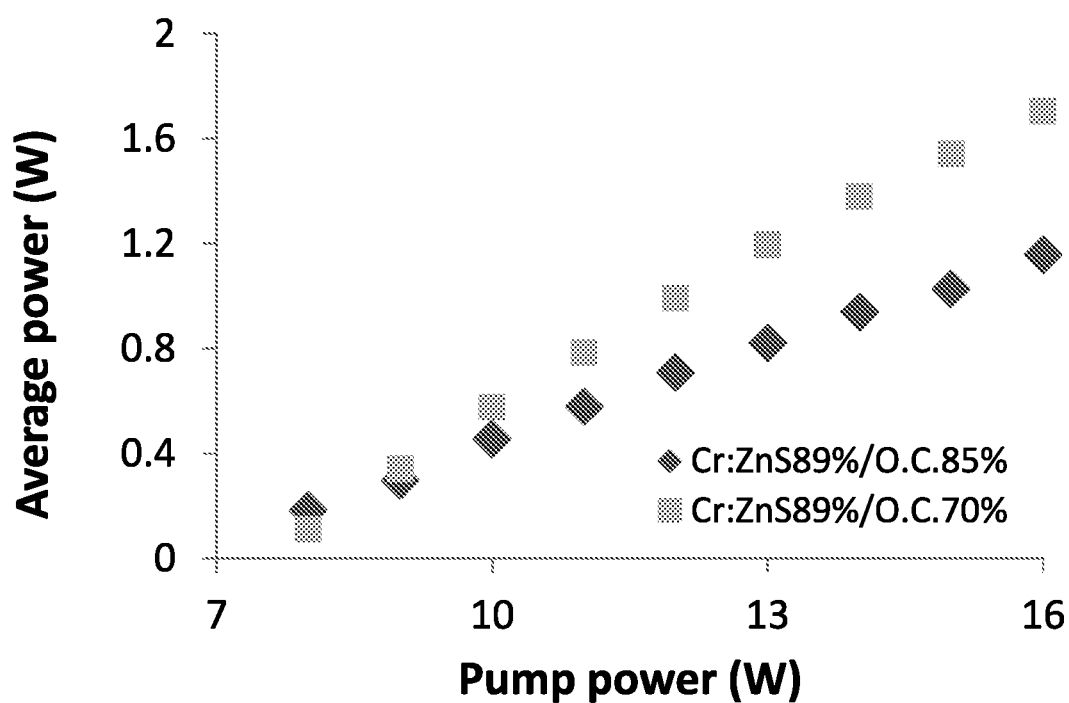
FIGS. 10A-B present graphs showing the performance of PQS Tm:YAP laser containing an output coupler (OC) with 70 or 80% reflection.

The laser average output power is shown in FIG. 10A.

Figure 10B:
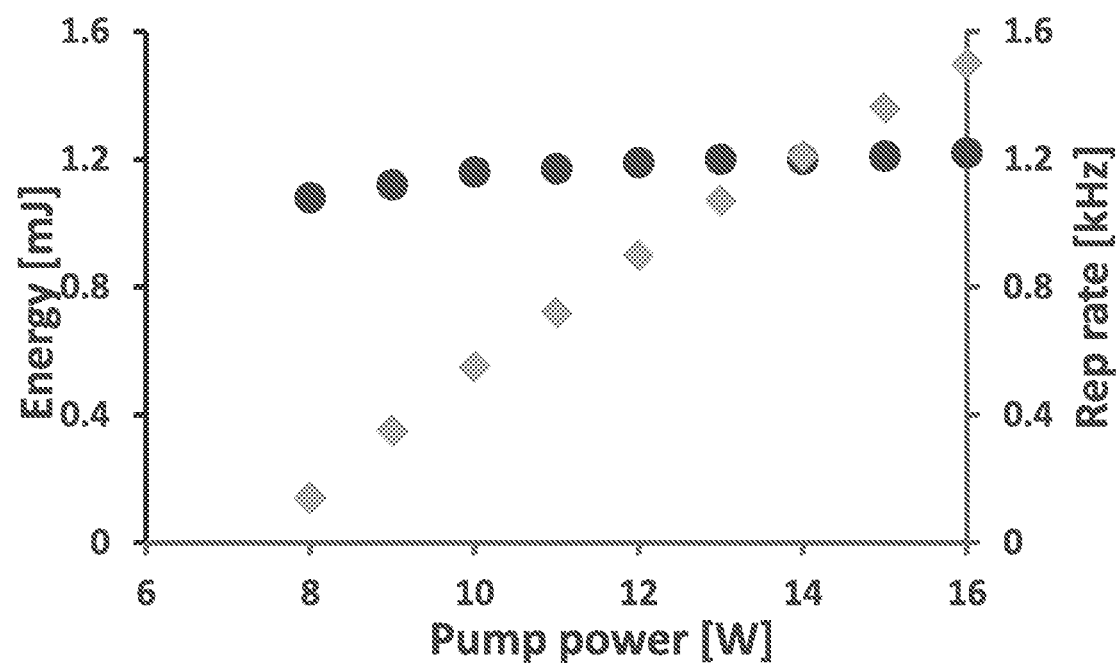

A maximum average output power of 1.6 W for 70% OC, and 0.9 W for 85% OC was achieved at the pump power of 16 W. The measured emission wavelength was of 1934 nm, and pulse duration was 24, 29 ns for 70% and 85% OC respectively (FIG. 10A). A maximum pulse energy of 1.22 mJ for 70% OC, and 1.5 mJ for 85% OC was measured, as shown in FIG. 10B. The repetition rate was in the range of 280-1660 Hz. The pulse energy and the repetition rate were almost constant, when an OC with 85% reflectance was used. The pulse energy and the repetition rate increased almost linearly, when an OC with 70% reflectance was used.

Figure 11:
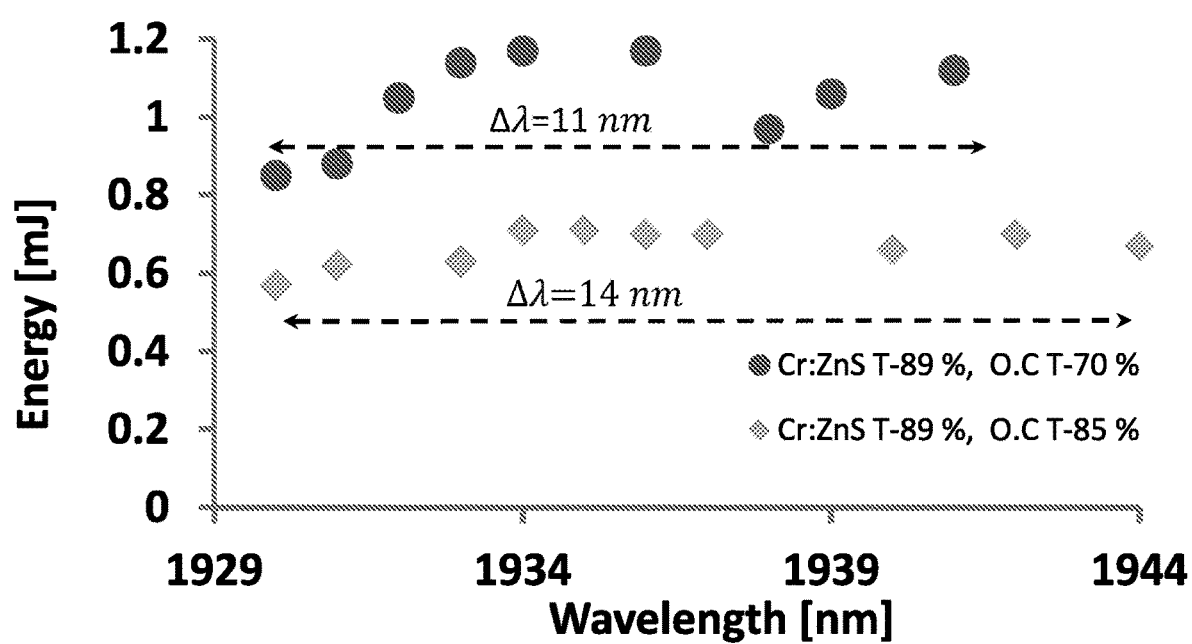
FIG. 11 presents a graph showing tunability performance of PQS Tm:YAP laser containing a saturable absorber with 89% transmission and an output coupler with 70 or 80% reflection.

The tunability range in the PQS mode was 11 nm using 70% OC, and could be increased to 14 nm by using 85% OC, as shown in FIG. 11. The laser wavelength was tuned, from 1930 to 1944 nm for 85% OC as shown in FIG. 11 achieving a continuous tuning range. The maximal pulse energy was 1.22 mJ at 1.5 kHz under an absorbed pump power of 12 W. Along the entire tuning range, the measured pulse energy did not fall from 0.85 mJ, as shown in FIG. 11.

Figure 12:
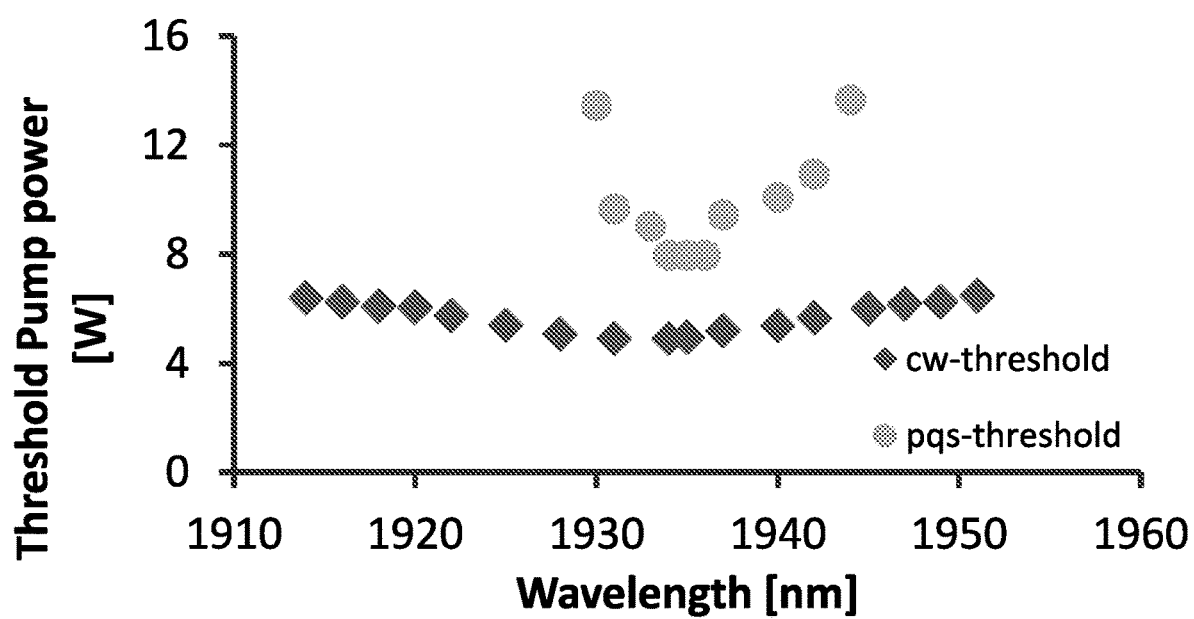
FIG. 12 presents a graph showing a threshold of the absorbed pump power of Tm:YAP laser at different wavelengths in continuous mode (CW) and in PQS mode.

FIG. 12 shows a threshold of the absorbed pump power of Tm:YAP laser at different wavelengths in continuous mode (CW) and in PQS mode. The absorbed pump power in PQS mode was almost constant in the operating wavelength range, however in CW mode the pump power showed a strong dependence on the wavelength (FIG. 12).

FIG. 13 shows an exemplary configuration of Tm:YLF laser coupled to an optical fiber. As shown in FIG. 13, a coupling efficiency of about 75% could be achieved. A coupling was achieved by using a collimation lens and a coupling lens to achieve focusing of the laser light into a fiber. The emission wavelength was 1885 nm, measured peak power was 40 kW, by an input power of 4 W. The optical fiber, used for this experiment, was a multimode silica core (low OH content) glass-clad fiber.

During the tuning measurements for the pulsed setup, the maximum pump power was reduced in order to diminish the probability of damaging the laser components.

Further, in one exemplary configuration presented here, during tuning, the lasers output power presents significant variations as a function of the emitted wavelength. Those power changes are mainly caused by the wavelength dependent gain spectrum. For the Tm:YLF gain medium, the emission cross section is strongly dependent on wavelength. Especially, when there is a significant drop in the gain cross section between the 1880 and 1908 nm peaks of emissions. These slightly deviation can be explained by the increase thermal population of the lower laser level for shorter wavelengths, typical to quasi-three-level lasers. Moreover, the emitted polarization of the presented laser strongly depends on the lasing wavelength. The emission up to 1890 nm is p-polarized, while longer wavelengths are s-polarized. This results are with excellent agreement with the reported luminescence of Tm:YLF, as the gain cross section is different for the two polarizations directions.

However, in another exemplary configuration, comprising a laser system with Tm:YAP crystal as the gain medium, wavelength dependent variations of lasers output power were less significant.

Despite this output power dependence on lasing wavelength, the laser configuration demonstrated here allows to achieve millijoule level pulsed lasing across the whole tuning range, limited only by the Etalon pair spectral transmission. Broader tuning range can be expected by optimizing the Etalons parameters.

In one exemplary embodiment of the current disclosure, a tunable pulsed Tm:YLF laser was demonstrated, reaching mJ level energy pulses and a tunability range of 33 nm between 1873-1906 nm. The maximum peak power of 53.2 KW is obtained at 1879 nm lasing wavelength. The use of Etalon plates also allowed the laser emission to achieve a narrow spectral bandwidth of 0.15 nm across the whole tunability range.

In another exemplary embodiment of the current disclosure, a tunable pulsed Tm:YAP laser was demonstrated, reaching mJ level energy pulses and a tunability range of 35 nm between 1925-1960 nm (for AQS operation mode) and a tunability range of 11 nm between 1930-1941 nm (for PQS operation mode). The tunability range for PQS mode could be further increased to about 20 nm by using a SA with 93% transmission. The maximum peak power of about 80 KW (for AQS operation mode) is obtained at 1935 nm lasing wavelength. The use of Etalon plates also allowed the laser emission to achieve a narrow spectral bandwidth of 0.15 nm across the whole tunability range. The useful combination of high energy pulses with both wide spectral tunability and narrow frequency lasing is presented for the first time, to the best of our knowledge, in a laser based on Tm doped gain media in the 2 μm range. These unique properties significantly enhance the versatility of this kind of laser systems, by allowing the tailoring of both pulse energy and emitted wavelength at the same time, and making this laser a promising tool in the burgeoning 2 μm laser field of applications.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

The invention claimed is:

1. A laser system, comprising:
a laser cavity;
a gain medium positioned within the laser cavity;
a pump source optically coupled to the gain medium;
an input mirror positioned at a first end of the laser cavity;
an output coupler positioned at a second end of the laser cavity; a first etalon having a thickness of between 10 to 50 μm positioned within the laser cavity and configured to tune the spectral range of the laser to at least 20 nm;
and a q-switching element positioned within the laser cavity;
wherein:
the laser system is configured to provide a pulsed laser beam at a selected wavelength ranging of 1700 to 3000 nm with a tunable spectral range of at least 20 nm;
the q-switching element provides a pulse switching of a laser beam;
and wherein the gain medium, the pump source, the input mirror, the output coupler, the first etalon, and the q-switching element are at a light-pass of the pulsed laser beam.

2. The laser system of claim 1, further comprising a second etalon at a light-pass of the pulsed laser beam, positioned next to the first etalon.

3. The laser system of claim 1, wherein the first and/or the second etalon comprises Yttrium Aluminum Garnet $Y_3Al_5O_{12}$ (YAG).

4. The laser system of claim 2, wherein the second etalon is characterized by a thickness of 100 to 600 1-1 m.

5. The laser system of claim 1, wherein the first etalon is characterized by a thickness of 10 to 100 1-1 m.

6. The laser system of claim 1, wherein the gain medium comprises at least one host crystal selected from the group consisting of: YAG, Yttrium Aluminum Perovskite $YAlO_3$ (YAP), Lithium Lutetium Fluoride (LiLuF), and Yttrium Lithium Fluoride (YLF).

7. The laser system of claim 1, wherein the host crystal is doped with a rare earth element selected from the group consisting of: Thulium (Tm), Holmium (Ho), Chromium (Cr), Erbium (Er), or any combination thereof.

8. The laser system of claim 1, wherein the gain medium comprisesa YAP and/or YLF host crystal doped with Tm.

9. The laser system of claim 1, wherein the pulsed laser beam is characterized by a wavelength in the range from 1800 to 2100 nm.

10. The laser system of claim 1, wherein the pulsed laser beam hasa spectral bandwidth of less than 1 nm.

11. The laser system of claim 1, wherein the q-switching element is selected from an active q-switching element and a passive q-switching element.

12. The laser system of claim 1, wherein the passive q-switching element comprises a saturable absorber configured to provide passive pulse switching of a laser beam.

13. The laser system of claim 1, wherein the saturable absorber comprises Cr:ZnS or Cr:ZnSe.

14. The laser system of claim 1, wherein the active q-switching element comprises an Acousto-Optic-Modulator (AOM) configured to provide active pulse switching of a laser beam.

15. The laser system of claim 1, further comprising one or more lenses, allowing to optically couple the pump source to the gain medium.

16. A method for producing a pulsed laser beam, the method comprises:
   a. providing a laser system comprising: a laser cavity;
      a gain medium positioned within the laser cavity;
      a pump source optically coupled to the gain medium;
      an input minor positioned at a first end of the laser cavity;
      an output coupler positioned at a second end of the laser cavity;
      a first etalon having a thickness of between 10 to 50 μm positioned within the laser cavity and configured to tune the spectral range of the laser to at least 20 nm;
      and a q-switching element positioned within the laser cavity; wherein the gain medium, the pump source, the input minor, the output coupler, the first etalon, and the q-switching element are at a light-pass of the pulsed laser beam;
   b. supplying electrical power to the pump source so as to energize the gain medium, thereby generating said pulsed laser beam at a selected wavelength ranging from 1700 to 3000 nm with a tunable spectral range of at least 20 nm.

17. The method of claim 16, wherein the laser system further comprises a secondetalon positioned next to the first etalon at a light-path of the pulsed laser beam.

18. The method of claim 16, wherein the pulsed laser beam is characterized by a pulse energy of at least 0.8 mJ.

19. The method of claim 16, wherein the pulsed laser beam is characterized by a wavelength in the range from 1800 to 2100 nm.

* * * * *